United States Patent
Yoshikawa et al.

(10) Patent No.: US 7,535,648 B2
(45) Date of Patent: May 19, 2009

(54) PROJECTION TYPE IMAGE DISPLAY

(75) Inventors: Hiroki Yoshikawa, Hiratsuka (JP); Takanori Hisada, Yokohama (JP); Tetsu Ohishi, Hiratsuka (JP); Koji Hirata, Yokohama (JP); Naoyuki Ogura, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/592,176

(22) Filed: Nov. 3, 2006

(65) Prior Publication Data

US 2007/0103604 A1    May 10, 2007

(30) Foreign Application Priority Data

Nov. 4, 2005    (JP) .............................. 2005-321006

(51) Int. Cl.
G03B 21/28    (2006.01)
G02B 3/00    (2006.01)
G02B 9/00    (2006.01)

(52) U.S. Cl. .................. 359/648; 359/726; 353/99; 353/101

(58) Field of Classification Search ......... 359/648–651, 359/726–731; 353/77, 78, 99–101
See application file for complete search history.

(56) References Cited

U.S. PATENT DOCUMENTS

| 6,779,897 | B2 * | 8/2004 | Konno et al. ................ 353/99 |
| 7,048,388 | B2 * | 5/2006 | Takaura et al. ............... 353/99 |
| 2001/0048558 | A1 * | 12/2001 | Lin .............................. 359/555 |
| 2004/0169828 | A1 | 9/2004 | Furuichi | |

FOREIGN PATENT DOCUMENTS

| JP | 2000-171897 | 6/2000 |
| JP | 2001-264627 | 9/2001 |
| JP | 2002-350774 | 12/2002 |
| JP | 2003-207740 | 7/2003 |
| JP | 2003-215713 | 7/2003 |
| JP | 2004-258218 | 9/2004 |
| JP | 2005-301074 | 10/2005 |

* cited by examiner

*Primary Examiner*—Darryl J Collins
(74) *Attorney, Agent, or Firm*—Antonelli, Terry, Stout & Kraus, LLP.

(57) ABSTRACT

An image that has been displayed on the display screen of an image generator is first passed through a projection lens section consisting of a front group and a rear group. Next after being reflected on the reflecting surface of a free-form surface mirror, the image is further reflected by a planar reflecting mirror and then obliquely projected from the lower section of a projection screen onto the screen. The front group of the projection lens section is provided for enlarging the image. In order to correct aberration due to oblique projection onto the projection screen, the rear group uses a free-form surface lens that forms a concave shape with respect to the exit side of light from the lens. The free-form surface mirror corrects trapezoidal distortion due to oblique projection onto the projection screen. The free-form surface lens in the rear group of the projection lens section can accommodate changes in environmental conditions by using one edge as a reference edge and rendering the other edge expandable. The free-form surface mirror can likewise use one edge as a reference edge and render the other edge expandable. For adjustment, the free-form surface mirror can also be pivoted about the reference edge.

9 Claims, 12 Drawing Sheets

FIG.5A Perpendicular cross section

FIG.5B Horizontal cross section

PROJECTION TYPE IMAGE DISPLAY

BACKGROUND OF THE INVENTION

The present invention relates generally to projection type image displays that make an enlarged projection-screen display of an image displayed on a display screen of an image display element, and to projection optical units for the image displays. More particularly, the invention concerns a projection type image display that makes an enlarged projection-screen display of an image displayed on a display screen of an image display element, and to a projection optical unit for the image display.

Projection type image displays that make an enlarged projection-screen display of an image displayed on a display screen of an image display element which uses a reflection or transmission type of liquid-crystal panel or micromirror are needed to be reduced in depth for compactness, as well as to be able to obtain an enlarged image of a sufficient size on the projection screen. Japanese Patent Laid-Open No. 2001-264627, for example, discloses a projection optical unit designed so that in order to realize the above needs, the unit projects an image in enlarged form by oblique projection, that is, by making image light enter a projection screen from an oblique direction.

Also, Japanese Patent Laid-Open No. 2002-350774, for example, discloses using a curved-surface mirror to conduct the oblique projection involved, and achieving optical adjustment by using the optics involved.

The technique described in Japanese Patent Laid-Open No. 2001-264627 includes disposing a free-form surface mirror of negative power, between projection optics and a projection screen, in order to correct the trapezoidal distortion of a projected image due to oblique projection onto the projection screen. This technique also corrects the aberration caused by the difference in projection distance between any two upper and lower portions of the screen by tilting the image display element or moving it in parallel with respect to coaxial projection optics. The aberration correction involved, however, is likely to misalign the screen-projected image in a vertical direction. Thus, a correction mechanism for the misalignment is further required.

In addition, although a method of correcting an image by moving a free-form surface mirror is disclosed in Japanese Patent Laid-Open No. 2002-350774, the foregoing aberration correction is not considered therein.

Furthermore, neither of the above two patent documents contains any considerations concerning increases in the amount of distortion due to the deformation of the free-form surface mirror in connection with changes in ambient environment.

SUMMARY OF THE INVENTION

The present invention was made with the above problems in view, and an object of the invention is to provide a projection type image display adapted such that trapezoidal distortion and aberration of a projected image due to oblique projection onto a projection screen can be effectively corrected with a compact configuration and such that any effects caused by environmental changes can be reduced. Another object of the invention is to provide a projection optical unit for the projection type image display.

One aspect of the present invention is a projection type image display equipped with a first optical system including a plurality of lenses for enlarging an image displayed on a display screen, and with a second optical system that causes image light of the image from the first optical system to reflect and then enter a projection screen at a required angle with respect to a normal of the projection screen. The second optical system includes at least one convex mirror whose reflection surface has at least one portion forming a convex shape in a direction of the reflection. The convex mirror is installed on an optics support unit such that among the edges of the mirror in the vertical direction of the mirror, one edge on which the image light from the first optical system is incident at a large angle is taken as a reference edge, and such that the other edge that the image light from the first optical system is incident at a small angle is taken as a movable edge.

Another aspect of the present invention is a projection type image display equipped with a first optical system including a plurality of lenses for enlarging an image displayed on a display screen, and with a second optical system that causes image light of the image from the first optical system to reflect and then enter a projection screen at a required angle with respect to a normal of the projection screen. The first optical system includes at least one asymmetric lens whose surface shape is concave in a direction that the light is emitted and rotationally asymmetric with respect to an optical axis. Also, the second optical system includes at least one convex mirror whose reflection surface has at least one portion forming a convex shape in a direction of the reflection. In addition, the asymmetric lens of the first optical system is installed in a lens barrel such that among the edges of the lens in the vertical direction of the lens, one edge from which the image light is emitted to the second optical system at a large angle is taken as a reference edge, and such that the other edge from which the image light is emitted to the second optical system at a small angle is taken as a movable edge.

Yet another aspect of the present invention is a projection type image display equipped with a first optical system including a plurality of lenses for enlarging an image displayed on a display screen, and with a second optical system that causes image light of the image from the first optical system to reflect and then enter a projection screen at a required angle with respect to a normal of the projection screen. The first optical system includes a projection lens section having at least a front group inclusive of coaxial optics having a surface of a shape symmetric to an axis which passes through approximately a central portion of the display screen, and a rear group inclusive of at least one free-form surface lens whose one or both surfaces have a free-form surface shape. The projection lens section is adapted such that the image displayed on the display screen will be projected in enlarged form onto the projection screen. The second optical system includes at least one free-form surface mirror of a free-form surface shape and projects the enlarged image from the projection lens section onto the projection screen from an oblique direction. Among the edges of the free-form surface lens that exist in a vertical direction thereof, one edge from which the image light is emitted to the second optical system at a large angle is installed as a reference edge in a lens barrel, and the other edge from which the image light is emitted to the second optical system at a small angle is installed as a movable edge in the lens barrel by use of a spring, a resilient body, or the like.

A further aspect of the present invention is a projection optical unit with a base on which are installed a first optical system including a plurality of lenses for enlarging an image displayed on a display screen, and a second optical system that causes image light of the image from the first optical system to reflect and then enter a projection screen at a required angle with respect to a normal of the projection screen. The first optical system includes a projection lens section having at least a front group inclusive of coaxial optics having a lens surface of a shape symmetric to an axis which passes through approximately a central portion of the display screen, and a rear group inclusive of at least one free-form surface lens whose one or both surfaces have a free-form surface shape. The projection lens section is adapted such that the image displayed on the display screen will be projected in enlarged form onto the projection screen. The second optical system includes at least one free-form surface mirror of a free-form surface shape and projects the enlarged image from the projection lens section onto the projection screen from an oblique direction. Among the edges of the free-form surface lens that exist in a vertical direction thereof, one edge from which the image light is emitted to the second optical system at a large angle is installed as a reference edge in a lens barrel, and the other edge from which the image light is emitted to the second optical system at a small angle is installed as a movable edge in the barrel by use of a spring, a resilient body, or the like.

DETAILED DESCRIPTION OF PREFERRED EMBODIMENTS

Figure 1:
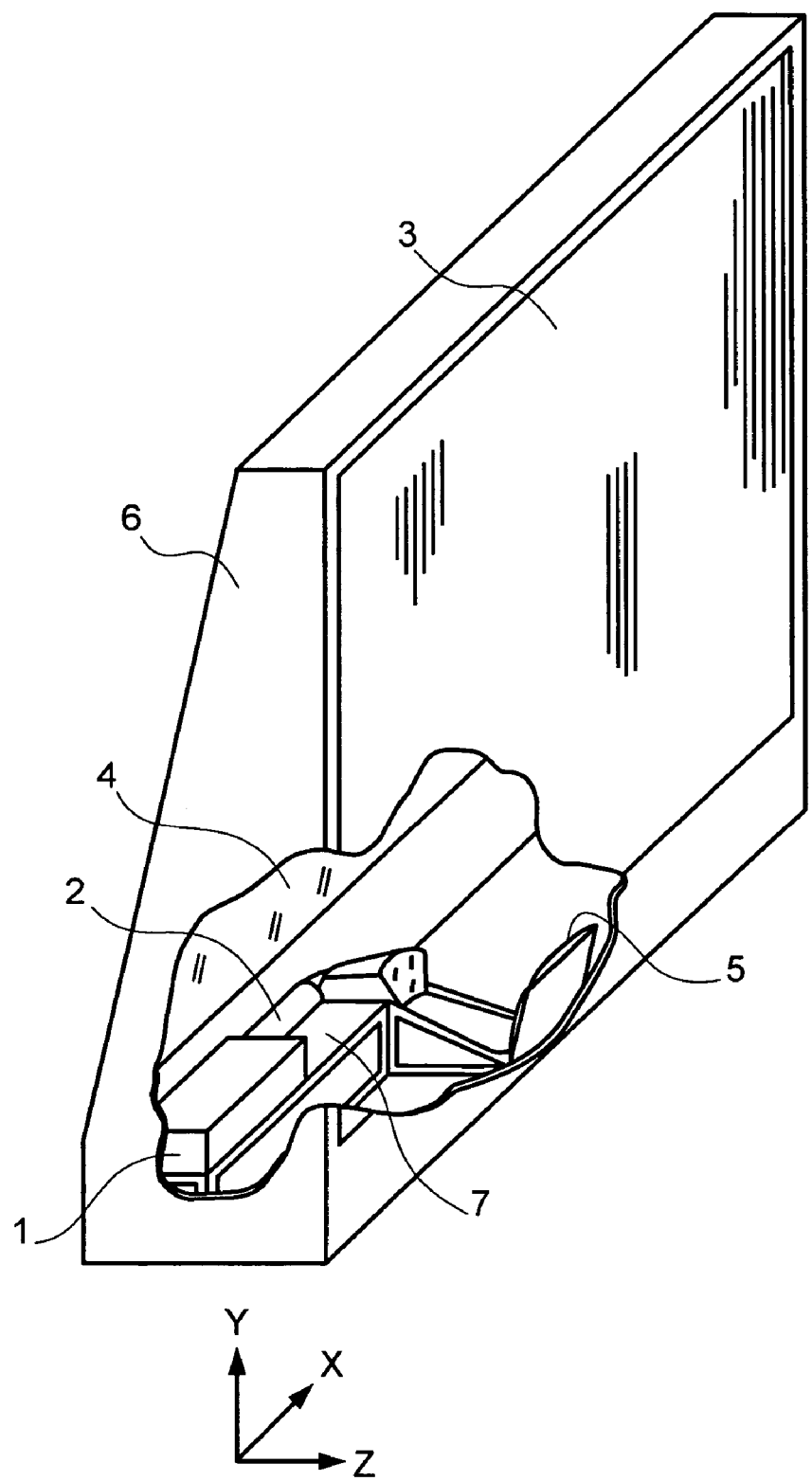
FIG. 1 is a perspective view showing an embodiment of an image display, partially showing its interior.

Embodiments of the present invention will be described hereunder using the accompanying drawings. FIG. 1 is a perspective view showing an embodiment of an image display according to the present invention, partially showing its interior, wherein reference number 1 denotes an image generator, 2 a projection lens section, 3 a projection screen, 4 a planar reflecting mirror, 5 a free-form surface mirror, 6 an enclosure, and 7 an optics base.

In FIG. 1, the image generator 1 adapted to form and display an image on its small-size display screen uses an optical modulator such as a reflection-type or transmission-type liquid-crystal panel or a display element including a plurality of micromirrors. The display screen may be a projection cathode-ray tube. The image that has been displayed on the display screen of the image generator 1 is enlarged when displayed on the projection screen 3. In an optical path of image light from the display screen to the projection screen 3, the image display has the projection lens section 2 that functions as a first optical system. In addition, the planar reflecting mirror 4 and free-form surface mirror 5 function as a second optical system. The projection lens section 2 enlarges the image displayed on the display screen of the image generator 1 and projects the image onto the projection screen 3. Image light that is light of the image displayed on the display screen of the image generator 1 is passed through the projection lens section 2, then reflected by the free-form surface mirror 5, and further reflected by the planar reflecting mirror 4 before being projected onto the projection screen 3. These constituent elements are provided inside the enclosure 6. In particular, the image generator 1, the projection lens section 2, and the free-form surface mirror 5 are integrally fixed as a single unit to the optics base 7. The first optical system includes a refractive mirror (described later herein) that bends the optical path of the image light and directs the light in a direction of the free-form surface mirror 5. The refractive mirror makes it possible to reduce depth of the image display.

The description below assumes a reference XYZ orthogonal coordinate system. This coordinate system takes an X-axis in a horizontal direction of the projection screen 3, that is, in a lateral (long-side) direction thereof, a Y-axis in a direction perpendicular to the X-axis, that is, in a vertical (short-side) direction of the projection screen 3, and a Z-axis in a direction perpendicular thereto, that is, in a direction perpendicular to a plane including the X- and Y-axes.

Figure 2:
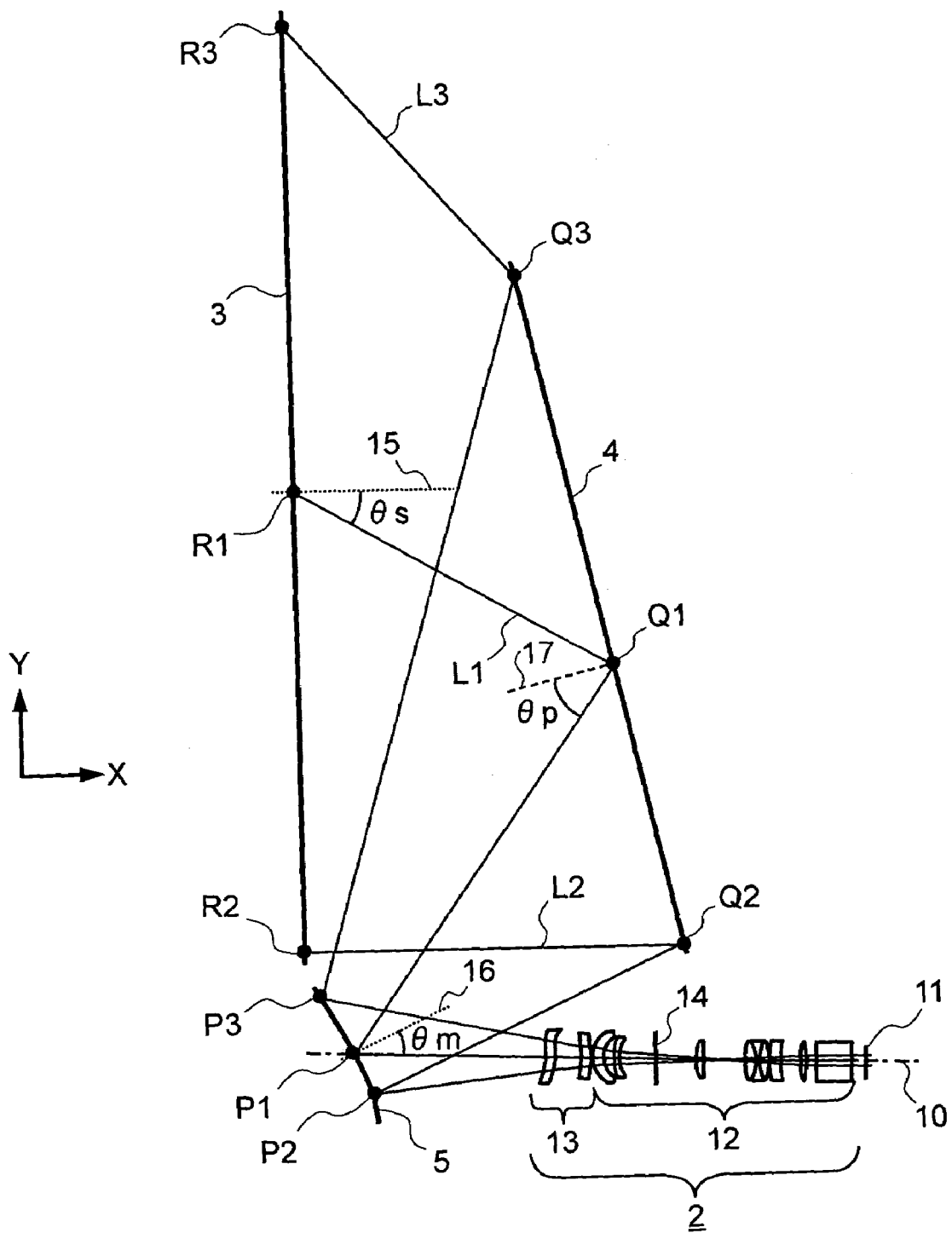
FIG. 2 is a sectional view showing, in a Y-Z planar fashion in a reference XYZ orthogonal coordinate system, a basic optical system configuration in the embodiment shown as a rear-projection-type image display in FIG. 1.

FIG. 2 is a sectional view showing, in a Y-Z planar surface in the reference XYZ orthogonal coordinate system, a basic optical system configuration in the embodiment shown as a rear-projection-type image display in FIG. 1. In FIG. 2, reference number 10 denotes an optical axis of the image light, and 11 the display screen (also referred to as an object surface) of the image display element forming the image generator 1 (shown in FIG. 1). Also, reference number 12 denotes a front group of the projection lens section 2, 13 a rear group thereof, 14 the foregoing refractive mirror, 15 a normal to the projection screen 3, 16 a normal to the free-form surface mirror 5, and 17 a normal to the planar reflecting mirror 4. Reference symbols L1, L2, L3 each denote a ray of light, P1, P2, P3 denote a central portion, lower edge, and upper edge, respectively, of a ray-reflecting area of the free-form surface mirror 5, Q1, Q2, Q3 denote a central portion, lower edge, and upper edge, respectively, of a ray-reflecting area of the planar reflecting mirror 4, and R1, R2, R3 denote a central portion, lower edge, and upper edge, respectively, of a ray-irradiating area of the projection screen 3. Sections equivalent to those of FIG. 1 are assigned the same reference numbers or symbols as used in FIG. 1. FIG. 2 shows a cross section represented along the Y-Z plane including the optical axis 10.

In FIG. 2, the image light emitted from the display screen 11 of the image display element forming the image generator 1 in FIG. 1 is made to enter the projection lens section 2 along the optical axis 10. The optical axis 10 passes through a central portion of the display screen 11 and aligns with an optical axis of the projection lens section 2. The projection lens section 2 includes the front group 12 constituted by a plurality of refracting lenses each having a lens surface of a rotationally symmetric shape, and the rear group 13 inclusive of at least a free-form surface lens having a lens surface of a rotationally asymmetric, appropriate, curved shape (hereinafter, referred to as free-form surface). The front group 12 includes the refractive mirror 14 having a planar reflective surface. The image light that has entered the projection lens section 2 is passed through the front group 12 first and then the rear group 13. Thus, the projection lens section 2 acts on the image light so as to enlarge the image on the display screen 11 of the image display element, and as described later herein, corrects aberration of the image projected onto the projection screen 3. During the passage of the image light through the front group 12 of the projection lens section 2, optical path 10 of the image light is, as described per FIG. 1, bent by the refractive mirror 14 to travel towards the free-form surface mirror 5 having a reflection face on the free-form curved surface.

The reflecting area of the free-form surface mirror 5 with the central portion thereof taken as P1, the upper edge as P3, and the lower edge as P2, is irradiated with the image light that has been emitted from the projection lens section 2, and then the image light is reflected by that reflecting area. The image light, after being reflected by the free-form surface mirror 5, is further reflected by the reflecting area of the planar reflecting mirror 4 with the central portion thereof taken as Q1, the upper edge as Q3, and the lower edge as Q2. Next, a projection area of the projection screen 3 with a central portion thereof taken as R1, an upper edge as R3, and a lower edge as R2, is irradiated with the image light. In this case, the ray of image light on the optical axis 10 (hereinafter, this ray is referred to as the screen central ray L1) is reflected at the central portion P1 of the reflecting area of the free-form surface mirror 5 and at the central portion R1 of the reflecting area of the planar reflecting mirror 4, and the central portion R1 in the projection area of the projection screen 3 is irradiated with the reflected central ray. A lower-edge ray of the image light emitted from the upper edge of the image display area of the display screen 11 (hereinafter, this ray is referred to as the screen lower-edge ray L2) is reflected at the lower edge P2 of the free-form surface mirror 5 and at the lower edge Q2 of the planar reflecting mirror 4, and the lower edge R2 of the projection screen 3 is irradiated with the reflected lower-edge ray. An upper-edge ray of the image light (hereinafter, this ray is referred to as the screen upper-edge ray L3) is reflected at the upper edge P3 of the free-form surface mirror 5 and at the upper edge Q3 of the planar reflecting mirror 4, and the upper edge R3 of the projection screen 3 is irradiated with the reflected upper-edge ray.

If the image display element is an optical modulator, it is required to have an illumination system such as a lamp to irradiate the optical modulator. The illumination system required in that case is omitted from FIG. 2. Alternatively, the image display element may be of a so-called three-plate scheme or any other scheme which forms an image by synthesizing a plurality of images. A synthesizing optical system such as the synthesizing prism required in such a scheme is also omitted from FIG. 2.

The projection lens section 2 is long and if the projection lens section 2 having this length is used, the image display element will be correspondingly distanced from the projection screen 3, in a normal-line direction of the image display element. The resulting increase in depth of the enclosure 6 (see FIG. 1) will be an obstruction to thickness reduction of the image display device. In the present embodiment, therefore, the front group 12 of the projection lens section 2 includes the refractive mirror 14 to bend the optical axis 10 of the image light almost perpendicularly in a direction of the free-form surface mirror 5, as described above. An array of optics from the image display element to the refractive mirror 14 in the front group 12 of the projection lens section 2 is made parallel to the surface of the projection screen 3 so that the free-form surface mirror 5 can be irradiated with the image light that is emitted from the projection lens section 2. Thus, the image display element can be positioned closer to the projection screen 3 and the thickness of the image display device can be reduced.

While the refractive mirror 14 in the present embodiment is disposed in the front group 12 of the projection lens section 2, it goes with saying that the refractive mirror 14 can be disposed at any other position instead, such as between the free-form surface mirror 5 and the projection lens section 2 or between the front group 12 and rear group 13 of the projection lens section 2.

The display screen 11 of the image display element is disposed so that the optical axis 10 passes through the central portion of the display screen 11, and the optical axis 10 is routed below the projection screen 3. Accordingly, the ray from the central portion of the display screen 11, on the optical axis 10, that is, the screen central ray L1 travels along an optical axis of the projection lens section 2, on the optical axis 10, then reaches the central portion P1 of the free-form surface mirror 5 at a downward angle (incident angle) θm to the normal 16 of the mirror 5, and is reflected at an upward angle θm. Next, the ray L1 reaches the central portion Q1 of the planar reflecting mirror 4 at a downward angle (incident angle) θp to the normal 17 of the mirror 4. After the ray L1 has been reflected at an upward angle θp, the central portion R1 of the projection screen 3 is irradiated with the ray L1. Accordingly, the central portion R1 of the projection screen 3 is irradiated with the screen central ray L1 at a downward angle (incident angle) θs with respect to the normal 15 of the projection screen 3 from the central portion R1. This means that the screen central ray L1 is irradiated onto (reaches) the central portion R1 of the projection screen 3 obliquely at an upward angle from the under side. Hereinafter, the angle θs is referred to as the oblique incident angle.

As the optical path of the ray L1 approaches the lower edge R2, the oblique incident angle θs becomes smaller and the image light rays incident on the projection screen 3 become close to horizontal rays. In short, the projection lens section 2 is provided so that the rays of image light that have been passed through the lens unit 2 along the optical axis thereof are projected obliquely onto the projection screen 3, and thus so that the optical axis of the projection lens section 2 is essentially oblique to the projection screen 3. When an image is projected onto the projection screen 3 in this way, the rectangular image, for example, that has been projected onto the projection screen will be displayed as an image of a trapezoidal shape. That is, so-called trapezoidal distortion will occur. When, as shown, an image is projected upward from the under side onto the projection screen 3, the projected image will be of a trapezoidal shape with its lower side of a short side. In addition, when the image is thus projected, an optical distance from a surface perpendicular to the optical axis, to the projection screen 3, will differ depending on the positions on the display screen (object surface) 11. Accordingly, images from each point on the object surface 11 are not projected with precise focusing on the screen 3, or the projected image suffers various aberrations due to rotational asymmetry to the optical axis.

The present embodiment corrects such distortion and aberration by having the rear group 13 of the projection lens section 2 and the free-form surface mirror 5 of the second optical system. The correction will be described hereunder.

The optical path of the screen upper-edge ray L3, extending from the upper edge P3 of the free-form surface mirror 5 through the upper edge Q3 of the planar reflecting mirror 4 to the upper edge R3 of the projection screen 3, is longer than the optical path of the screen lower-edge ray L2 that extends from the lower edge P1 of the free-form surface mirror 5 through the lower edge Q2 of the planar reflecting mirror 4 to the lower edge R2 of the projection screen 3. This means that when viewed from the projection lens section 2, an image point at the upper edge R3 of the projection screen 3 is more distant than an image point at the lower edge R2 of the projection screen 3. Such differences in optical path length between various points in the Y-axis direction of the projection area of the projection screen 3 cause the foregoing trapezoidal distortion and/or aberration of the projected image.

If an object point (on the display screen 11) that is associated with the image point at the upper edge R3 of the projection screen 3 is positioned closer to the projection lens section 2 and if an object point associated with the image point at the lower edge R2 of the projection screen 3 is positioned away from the projection lens section 2, this positioning is useful for correcting the differences in optical path length. In order to realize this, a normal-line vector placed centrally on the display screen 11 of the image display element is inclined to the optical axis 10 leading to the projection lens section 2. More specifically, this normal-line vector is inclined to point towards the central portion R1 of the projection screen 3. It is known that there is a method of inclining an object plane to obtain an image plane inclined to an optical axis.

However, if the known method mentioned above is actually used to incline the display screen 11 to a plane perpendicular to the optical axis 10, although the known method is effective for reducing lower-order trapezoidal distortion of an image surface (on the projection screen 3), a field angle of a practical magnitude will, because of the magnitude, cause the image surface on the projection screen 3 to suffer residual trapezoidal distortion and hence, deformational distortion asymmetric to the optical axis. Various aberrations will also result. It is difficult to correct such distortion and aberrations with the projection lens of which the lens surface has a rotationally asymmetric, curved shape.

The present embodiment significantly reduces the lower-order distortion of the image surface on the projection screen 3 by making the object plane, that is, the display screen 11, oblique to the optical axis 10. The embodiment is also adapted to accommodate (correct) aberration as well as image surface deformation asymmetric to the optical axis, by using a lens having a lens surface of a rotationally asymmetric free-form surface shape and a reflecting mirror having a rotationally asymmetric free-form reflection surface.

Next, a description will be given of operation of each optical element for correcting the trapezoidal distortion that remains on the image surface even after the object surface 11 has been inclined to the optical axis 10, other forms of deformational distortion as well as various aberrations.

As shown in FIG. 2, the front group 12 of the projection lens section 2, constituting the first optical system, is a main lens for projecting the image on the display screen (object surface) 11 of the image display element onto the projection screen 3. The front group 12 corrects basic aberrations in the rotationally symmetric optical system. The rear group 13 of the projection lens section 2 includes a lens having a lens surface of a rotationally asymmetric, free-form surface shape, that is, a free-form surface lens. The free-form surface lens has a shape curved to be concave with respect to a direction that light is emitted from the lens, that is, a direction towards the free-form surface mirror 5.

The second optical system includes a reflecting mirror having a reflection surface of a rotationally asymmetric free-form curved surface shape, that is, the free-form surface mirror 5. The free-form surface mirror 5 is a rotationally asymmetric convex mirror having at least a part of its reflection surface curved to form a convex shape in a direction of incidence/reflection of the light. More specifically, a curvature of that portion on the reflection surface of the free-form surface mirror 5 which reflects the screen lower-edge ray L2 heading for the lower edge R2 of the projection screen 3 is greater than a curvature of a portion which reflects the screen upper-edge ray L3 heading for the upper edge R3 of the projection screen 3. That is to say, the reflecting area from the central portion P1 to the lower edge P2 has a curvature greater than that of the reflecting area from the central portion P1 to the upper edge P3. In addition, the reflecting area of the free-form surface mirror 5 may be formed so that the above-mentioned portion to reflect the screen lower-edge ray L2 heading for the lower edge R2 of the projection screen 3 forms a convex shape towards the reflecting direction of the ray, and so that the above-mentioned portion to reflect the screen upper-edge ray L3 heading for the upper edge R3 of the projection screen 3 forms a concave shape towards the reflecting direction of the ray.

Since the free-form surface mirror 5 has the reflecting surface shape described above, the image light reflected in an area closer to the upper edge P3 of the mirror 5 than to the central portion P1 thereof travels towards the planar reflecting mirror 4 so as to converge, and the image light reflected in an area closer to the lower edge P2 of the mirror 5 than to the central portion P1 thereof travels towards the planar reflecting mirror 4 so as to diverge. Thus, the above-mentioned deformational distortion of the image surface on the projection screen 3 can be corrected by inclining the object surface 11 with respect to the optical axis 10.

In addition, at the rear group 13 of the projection lens section 2, the free-form surface lens used in the rear group 13 causes the image light to locally converge and diverge. This, in turn, makes it possible to correct the above-mentioned aberration of the image surface on the projection screen 3 by inclining the object surface 11 with respect to the optical axis 10.

As described above, in the present embodiment, the first optical system includes at least one free-form surface lens and the second optical system includes at least one free-form surface lens. Both the rotationally asymmetric deformation and aberration of the object surface on the projection screen 3 can thus be corrected by inclining the object surface 11 with respect to the optical axis 10.

A distance along the optical axis 10 between a coordinate origin of the reflecting surface of the free-form surface mirror 5 in the second optical system (in the present embodiment, coordinates of a position at which the screen central ray L1 is reflected are defined as the above coordinate origin) and the lens surface closest to the second optical system among lens surfaces in the front group 12 of the projection lens section 2, is desirably set to be at least five times as long as the focal distance of the front group 12. Accordingly, the reflecting surface of the second optical system functions to effectively correct the deformational distortion and aberration of the image surface on the projection screen 3 and thus to obtain high performance.

In the present embodiment, the deformational distortion and aberration of the image which has been projected onto the projection screen 3 is corrected by using the free-form surface mirror 5 independently of the planar reflecting mirror 4 adapted for directly projecting the image onto the projection screen 3. The free-form surface mirror 5 in this case is used for the reasons below.

Free-form surface mirrors tend to be more difficult to be manufactured as their sizes increase. Thus, it is important to manufacture the free-form surface mirrors smaller than required sizes. For example, the size of a reflecting mirror for projecting image light directly onto the projection screen is larger than at least about 70% of the screen size, and this mirror size is larger than 500 mm for a large-screen projector of a 50-inch size or more. If the reflecting surface of this reflecting mirror is formed into a rotationally asymmetric free-form curved shape, the reflecting mirror will be very difficult to be manufactured. For a rear projector, therefore, it is not appropriate to form the reflecting surface of the screen projection reflecting mirror into a rotationally asymmetric free-form curved shape.

Therefore, in the present embodiment, as shown in FIG. 2, in addition to the planar reflecting mirror 4 provided as a reflecting mirror for projecting image light onto the projection screen 3, another reflecting mirror having a reflecting surface formed into a rotationally asymmetric free-form curved shape is provided between the planar reflecting mirror 4 and the projection lens section 2. The reflecting mirror having a reflecting surface formed into a rotationally asymmetric free-form curved shape is the free-form surface mirror 5. Image light from the projection lens section 2 is reflected by the free-form surface mirror 5 first and then the planar reflecting mirror 4 before being projected onto the projection screen 3. Since the free-form surface mirror 5 is disposed closer to the projection lens section 2 than the planar reflecting mirror 4, the mirror 5 can be dimensionally reduced and the reflecting surface thereof can be easily formed into a rotationally asymmetric free-form curved shape.

In the present embodiment, the above configuration makes it possible to correct the deformation and aberration of the image projected on the projection screen 3 due to oblique projection, without causing an increase in eccentricity of the projection lens section 2 having a refractive surface, increase in diameter of the lens, or increase in the number of lenses. The above configuration also makes it possible to realize an easily manufactured projection optical unit of small depth, provide a compact set reduced in depth and in projection screen bottom height, and provide easily manufactured optics including a compact free-form surface mirror.

In the above configuration, the optical path is bent on the X-Z plane by the refractive mirror 14 such that the optical path from the display screen 11 of the image display element in the image generator to the bend is parallel to the long side of the projection screen 3. The advantageous effects mentioned above can likewise be obtained by bending the above optical path towards the free-form surface mirror 5, on the X-Y plane, in such a way that the optical path from the display screen 11 of the image display element in the image generator to the bend is made parallel to the short side of the projection screen 3.

Figure 3:
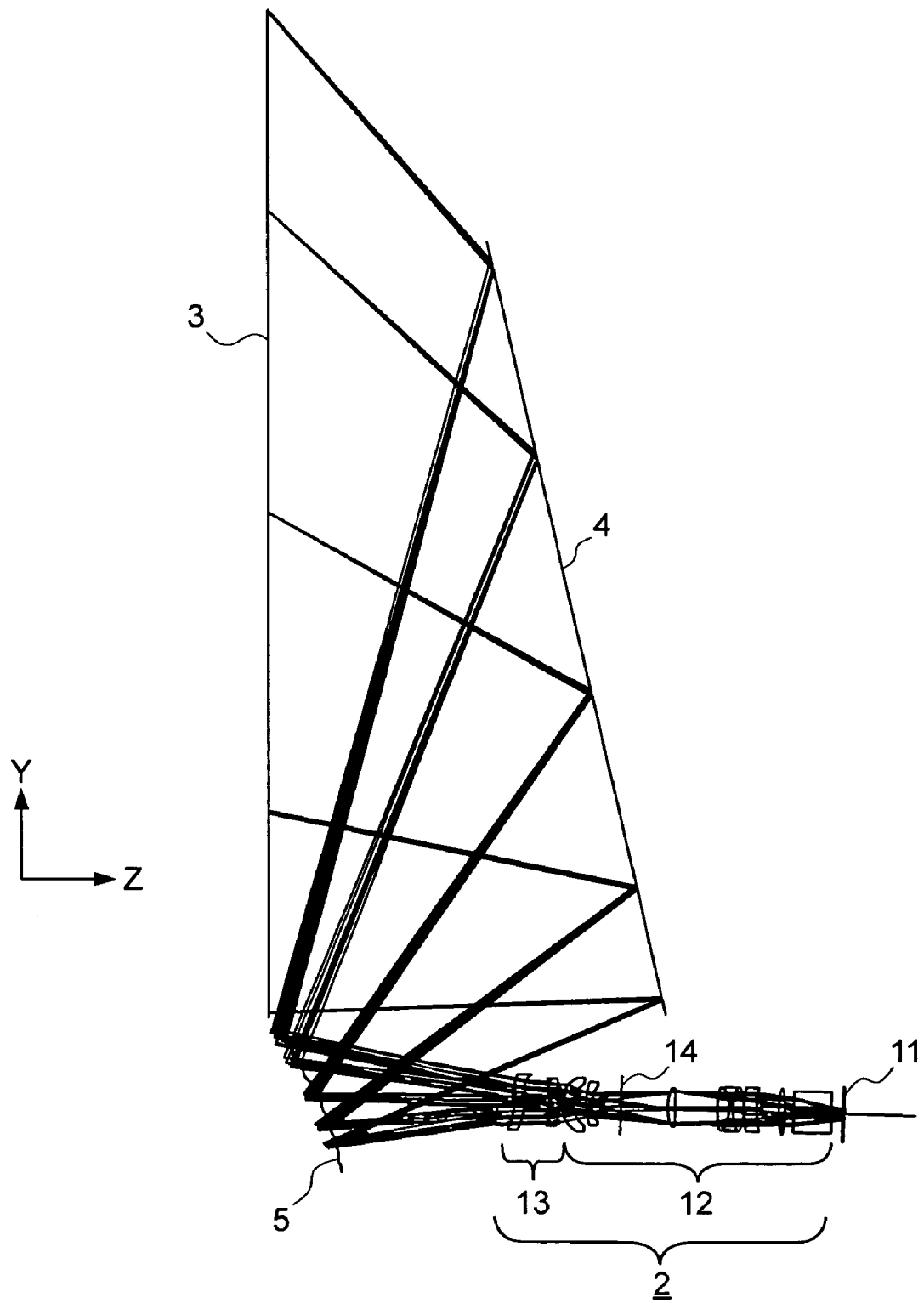
FIG. 3 is a ray diagram that shows paths of the image light emissions from various points on a display screen of the image display of FIG. 1 in a Y-Z planar surface in the above-mentioned reference XYZ orthogonal coordinate system.
Figure 4:
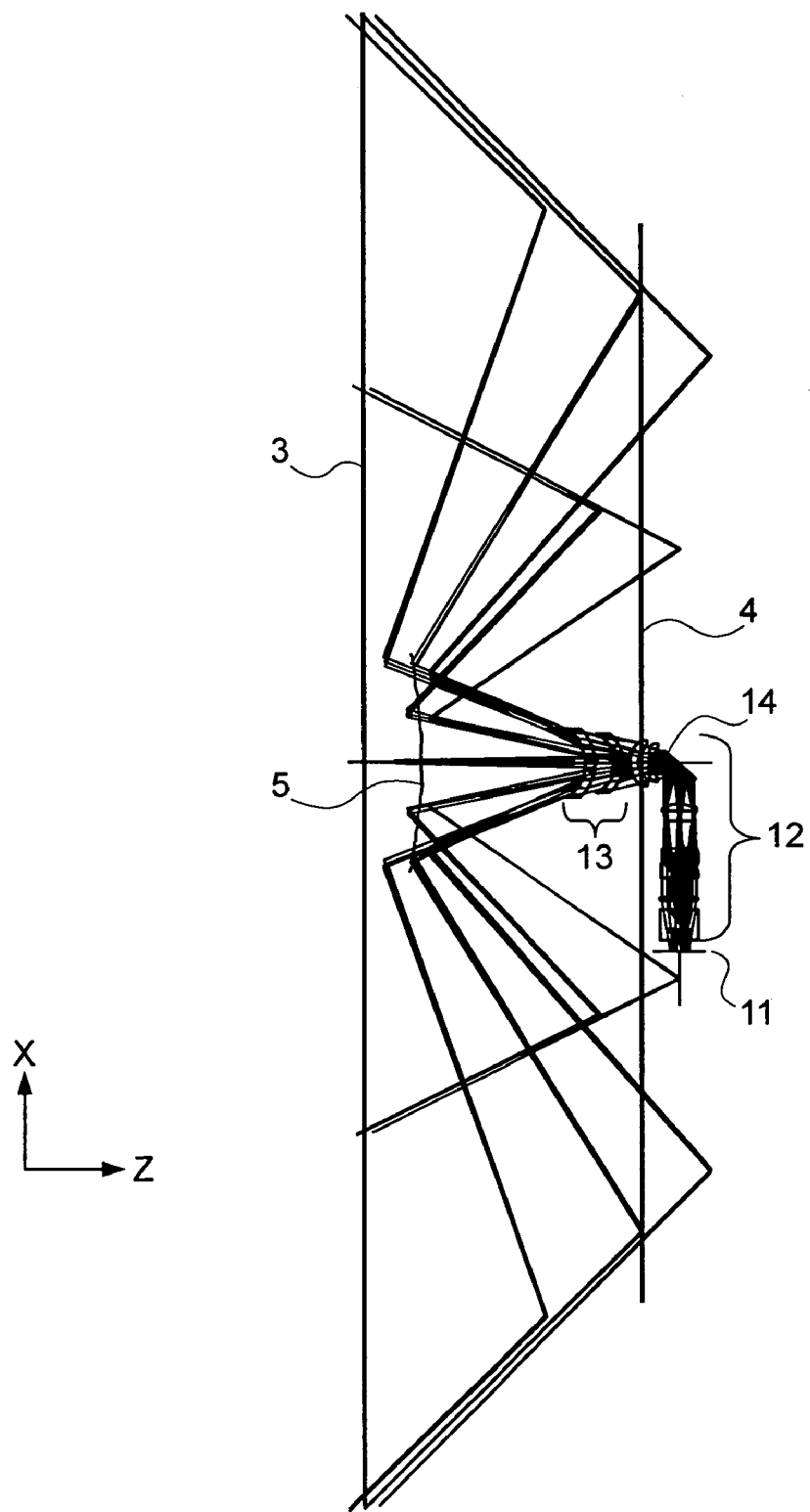
FIG. 4 is a ray diagram that shows the paths of the image light emissions from various points on the display screen of the image display of FIG. 1 in an X-Z planar surface in the above-mentioned reference XYZ orthogonal coordinate system.

FIGS. 3 and 4 are ray diagrams of the optical systems of the above configuration in the present embodiment, FIG. 3 showing the paths of the image light emissions from various points on the display screen 11 of the image display element in the Y-Z plane in the XYZ orthogonal coordinate system, and FIG. 4 showing the above paths in the X-Z plane. In both FIGS. 3 and 4, sections equivalent to those of FIG. 2 are assigned the same reference numbers as used in FIG. 2. While in FIGS. 3 and 4 the refractive mirror 14 is provided in the front group 12 of the projection lens section 2, the refractive mirror 14 may, as described previously, be disposed at any other position such as between the front group 12 and the rear group 13 or between the front group 12 and the free-form surface mirror 5.

In FIGS. 3 and 4, image light that has been emitted from the display screen 11 of the image display element is first passed through the front group 12 of the projection lens section 2 including a plurality of lenses. In this case, the front group 12 is constituted only by at least one lens having a rotationally symmetric lens surface. Next, the image light is passed through the rear group 13 including a lens surface of a rotationally asymmetric free-form curved shape, that is, a free-form surface lens, and then the image light is reflected by the reflecting surface of the free-form surface mirror 5 which is the second optical system. The reflected light is further reflected by the planar reflecting mirror 4 and then projected onto the projection screen 3.

Next, specific examples of data on the optical systems employed in the present embodiment will be described hereunder.

Figure 5:
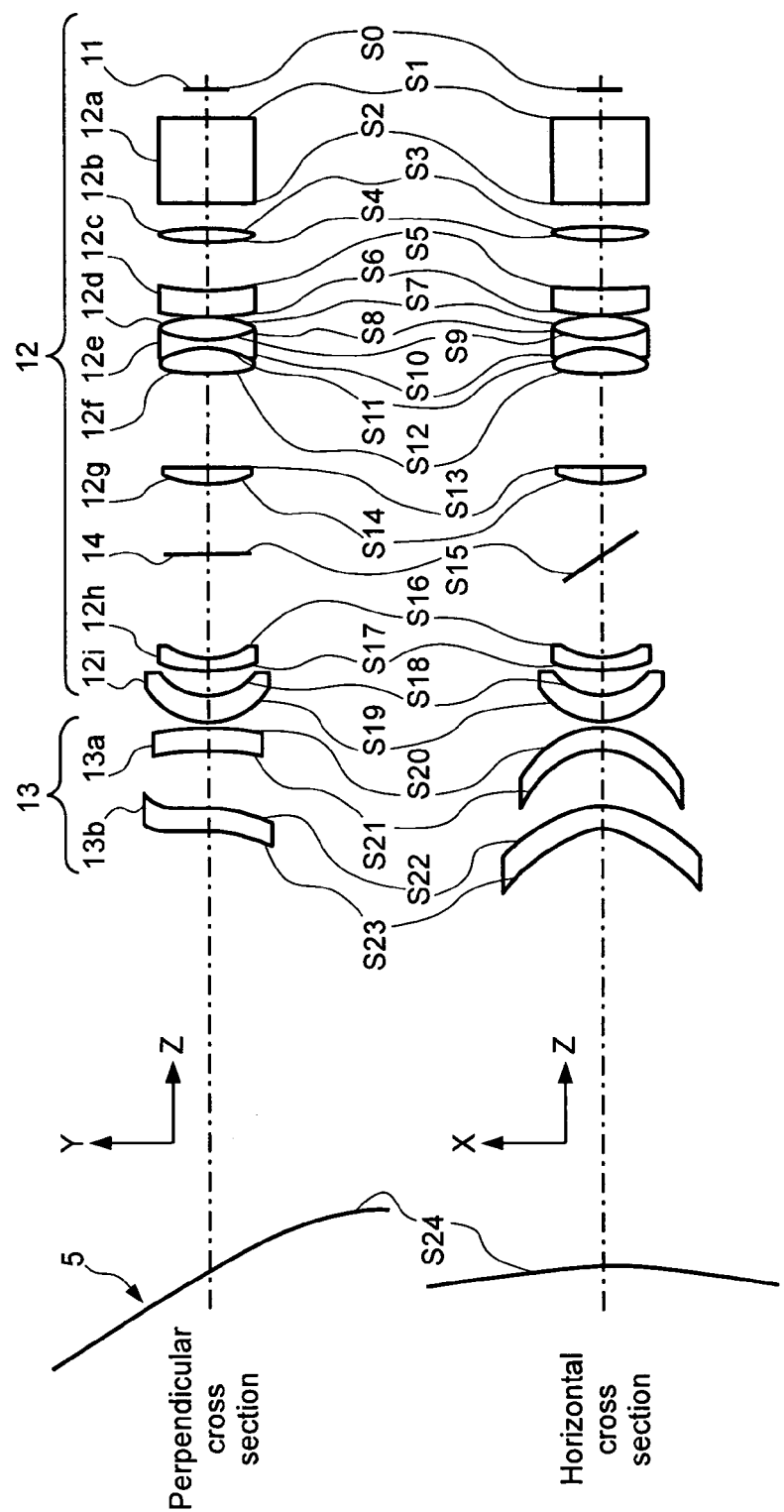
FIGS. 5A and 5B are diagrams each showing a more specific example of a configuration of a projection lens section and free-form surface mirror section in the optical systems of FIG. 2.

FIGS. 5A, 5B are diagrams each showing a more specific example of a configuration of the projection lens section 2 and free-form surface mirror 5 in the optical systems of FIG. 2. FIG. 5A shows a configuration in Y-Z planar surface, and FIG. 5B shows a configuration in X-Z planar surface. In FIGS. 5A, 5B, reference symbols 12a-12i, 13a, 13b denote lenses, and sections equivalent to those of FIG. 2 are assigned the same reference numbers as used in FIG. 2.

In FIGS. 5A, 5B:
S0 denotes an image display surface (object surface) on a display screen 11 of an image display element,
S1-S12 and S14-S23 denote lens surfaces,
S13 denotes a reflecting surface of a refractive mirror 14, and
S24 denotes a reflecting surface of a free-form surface mirror 5.

That is to say, a front group 12 of the projection lens section 2 includes, from the display screen 11 in order, a lens 12a (in the present embodiment, synthesizing prism) having a lens surface S1 in a direction of the display screen 11 and a lens surface S2 in a direction opposite to that of the lens surface S1, and similarly, a lens 12b with lens surfaces S3, S4, a lens 12c with lens surfaces S5, S6, a lens 12d with lens surfaces S7, S8, a lens 12e with lens surfaces S9, S10, a lens 12f with lens surfaces S11, S12, a lens 12g with lens surfaces S14, S15, a lens 12h with lens surfaces S16, S17, and a lens 12i with lens surfaces S18, S19. Also, the refractive mirror 14 with the reflecting surface S13 is provided between the lenses 12g, 12h. A rear group 13 of the projection lens section 2 includes, from the front group 12 in order, a lens 13a with lens surfaces S20, S21, and a lens 13b with lens surfaces S22, S23. In addition, the free-form surface mirror 5 is disposed such that the reflecting surface S24 faces an emission surface of the projection lens section 2 (i.e., the lens surface S23 of the lens 13b). Furthermore, as is obvious from FIG. 2, the planar reflecting mirror 4 is disposed such that a reflecting surface S25 faces the reflecting surface S24 of the free-form surface mirror 5, and the projection 3 is disposed such that a projection surface S26 faces the reflecting surface S25 of the planar reflecting mirror 4.

Specific examples of data on the optical elements employed when an image that measures 16 mm horizontally and 9 mm vertically on the display screen (object surface) 11 is to be projected in enlarged form onto the projection screen 3 as an image which measures 1,452.8 mm horizontally and 817.2 mm vertically, will be described hereunder.

First, examples of data on each optical element shown in FIGS. 5A, 5B are listed in Table 1.

TABLE 1

| Surface | Rd | TH | nd | vd |
|---|---|---|---|---|
| S0 | Infinity | 10.00 | | |
| S1 | Infinity | 31.34 | 1.51827 | 48.0 |
| S2 | Infinity | 7.06 | | |
| S3 | 246.358 | 4.65 | 1.85306 | 17.2 |
| S4 | −84.858 | 18.00 | | |
| S5* | −83.708 | 9.00 | 1.49245 | 42.9 |
| S6* | −75.314 | 0.10 | | |
| S7 | 41.651 | 9.32 | 1.49811 | 60.9 |
| S8 | −42.282 | 0.00 | | |
| S9 | −42.282 | 2.50 | 1.76014 | 20.0 |
| S10 | 29.550 | 0.10 | | |
| S11 | 29.476 | 9.00 | 1.49811 | 60.9 |
| S12 | −79.153 | 25.90 | | |
| S13 | Infinity | 9.10 | | |
| S14 | −265.353 | 6.00 | 1.85306 | 17.2 |
| S15 | −53.869 | 65.00 | | |
| S16 | −24.898 | 4.19 | 1.74702 | 33.2 |
| S17 | −58.225 | 9.00 | | |
| S18* | −27.332 | 10.00 | 1.49245 | 42.9 |
| S19* | −32.424 | 2.50 | | |
| S20 # | Infinity | 8.00 | 1.49245 | 42.9 |
| S21 # | Infinity | 20.51 | | |
| S22 # | Infinity | 8.00 | 1.49245 | 42.9 |
| S23 # | Infinity | 160.99 | | |
| S24 # | Infinity | −400.00 | REFL | |
| S25 | Infinity | 305.00 | REFL | |
| S26 | Infinity | — | | |

In Table 1, the surfaces of optical components are denoted by the reference symbols S0-S26 shown in FIGS. 5A, 5B. Also, a radius Rd (mm) of each surface at a vertex (center) of an optical axis which passes through the surface, intersurface clearance TH (mm), a refractive index "nd" of the lens, and an Abbe number vd are listed for each surface. When arbitrary surfaces are described, these surfaces are each expressed as a surface S.

Rotationally symmetric non-spherical surfaces are marked with an asterisk (*) in FIGS. 5A, 5B and Table 1. The description below assumes that four lens surfaces in the front group 12 of the projection lens section 2, namely, the lens surfaces S5, S6 of the lens 12c and the lens surfaces S18, S19 of the lens 12i, form a rotationally symmetric non-spherical shape. Other lens surfaces S of the front group 12 each form a rotationally symmetric spherical shape. Rotationally asymmetric free-form curved surfaces are marked with a sharp symbol (#). The description below assumes that the lens surfaces S20, S21 and S22, S23 of the lenses 13a and 13b, respectively, in the rear group 13 of the projection lens section 2, are rotationally asymmetric free-form curved surfaces, and that the reflecting surface S24 of the free-form surface mirror 5 is a rotationally asymmetric free-form curved surface. The surface S25 is the reflecting surface of the planar reflecting mirror 4 in FIG. 2, and the surface S26 is the projection surface of the projection screen 3 in FIG. 2.

The radius Rd of a surface S in Table 1 is the radius of the lens surface of the lens 12a-12i at the vertex (center) of the optical axis which passes through the particular lens surface. "Infinity" in Table 1 indicates that the surface S0 of the display screen 11, the lens surfaces S1, S2 of the lens 12a, and the reflecting surface S13 of the refractive mirror 14 each have an infinite radius of curvature, Rd, that is, form a planar shape. The radius Rd of each lens surface S takes a positive value when the lens surface forms a convex shape towards the display screen 11, and takes a negative value when the lens surface forms a convex shape in the direction opposite to the display screen 11. For example, since the lens surface S3 of the lens 12b forms a convex shape towards the object surface S0 and since the lens surface S10 of the lens 12e forms a concave shape towards the object surface S0, the radii of curvature, Rd, of the lens surfaces S3, S10 take positive values. In addition, for example, since the lens surface S4 of the lens 12b forms a convex shape in the direction opposite to the object surface S0 and since the lens surface S9 of the lens 12e forms a concave shape in the direction opposite to the object surface S0, the radii of curvature, Rd, of the lens surfaces S4, S9 take negative values.

The lens surfaces S3, S4, S7-S14, S16, S17 that are not marked with "*" and "#", and do not have an infinite radius Rd are of a rotationally symmetric spherical shape.

The intersurface clearance TH in Table 1 is the distance to the vertex (center), on the optical axis 10, of the surface of the optical component next disposed in the traveling direction of image light along the optical axis thereof. For example, an intersurface clearance TH of "10.00" for the surface S0 of the display screen 11 indicates that the distance from the surface S0 to the lens surface S1 of the next lens 12a, on the optical axis 10, is 10.00 mm. When a surface S of the optical component next disposed in the traveling direction of the light is viewed from a surface S of a current optical component, if the former surface S is, on the Y-Z plane, closer to the image generator (namely, the object surface 11) than the latter surface S, the intersurface clearance TH of the former surface S takes a negative value. Conversely, if the former surface S is present in the direction opposite to the object surface 11 and more distant than the latter surface S, the intersurface clearance TH of the former surface S takes a positive value. In Table 1, an intersurface clearance TH of "−400.00" is shown for the reflecting surface S24 of the free-form surface mirror 5. The distance, along the optical axis of image light, between a central portion P1 of the reflecting surface S24 and a central portion Q1 of the reflecting surface S25 of the planar reflecting mirror 4 is 400 mm. The central portion Q1 is placed where the reflecting surface S25 is irradiated with a screen central ray L1 and then the ray L1 is reflected. The negative value of "−400.00" is shown because the central portion Q1 of the reflecting surface S25 of the planar reflecting mirror 4 is closer to the object surface 11 than the central portion P1 of the reflecting surface S24 of the free-form surface mirror 5. The respective intersurface clearances TH of other surfaces S1-S23 and S25 take positive values since each of these surfaces is, on the Y-Z plane, more distant from the object surface 11 than the next surface S.

The refractive index "nd" in Table 1 indicates the refractive index of the lens 12a-12i, 13a, 13b in the projection lens section 2, and the Abbe number vd indicates the Abbe number of the lens. For example, the lens 12a with the lens surfaces S1, S2 have a refractive index "nd" of 1.51827 and an Abbe number of 48.0. Characters "REFL" under the column of refractive index "nd" in Table 1 denote reflection. The surfaces S24, S25 for which the refractive index "nd" is shown as "REFL" are reflecting surfaces. Incidentally, the surface S24 is the reflecting surface of the free-form surface mirror 5 and the surface S25 is the reflecting surface of the planar reflecting mirror 4.

The rotationally symmetric non-spherical shapes of the lens surfaces S5, S6 of the lenses 12c and S18, S19 of the lenses 12i that are marked with "*" in Table 1 are each represented by numerical expression 1 described below using a local cylindrical coordinate system whose origin is set at the vertex (center) of each such surface through which the optical axis passes.

$$Z = \frac{cr^2}{1+\sqrt{1-(1+k)c^2r^2}} + A \cdot r^4 + B \cdot r^6 + C \cdot r^8 + D \cdot r^{10} + E \cdot r^{12} + F \cdot r^{14} + G \cdot r^{16} + H \cdot r^{18} + J \cdot r^{20}$$

[Numerical expression 1]

where
r: distance from (i.e., ray height above or below) the optical axis of the lens surface, on a plane that includes the vertex through which the optical axis passes, and that is perpendicular to the optical axis,
Z: distance (sag) from a point present at the distance "r" from the optical axis on the above plane, to a point on the lens surface in a parallel direction to the optical axis,
c: curvature of the lens surface at the above vertex,
k: conical constant, and
A-l: coefficients of exponential terms of "r".

The surface shape represented by numerical expression 1 is rotationally symmetric around the optical axis since the sag Z at a position with respect to the position on the same circumference that is distanced from the optical axis to radius "r" is constant. The curvature "c" is a reciprocal of the radius Rd in Table 1.

Table 2 lists specific values of the conical constant "k" and coefficients A-l in numerical expression 1, plotted for the lens surfaces S5, S6 and S18, S19 of the rotationally symmetric non-spherical lenses 12c and 12i, respectively, in the front group 12 of the projection lens section 2.

TABLE 2

| Surface | | Aspheric coefficient | | | | | | | |
|---|---|---|---|---|---|---|---|---|---|
| S5 | K | −11.7679 | C | −1.2E−11 | F | 2.99E−20 | J | −1.3E−26 |
| | A | −2.8E−06 | D | −3.3E−14 | G | 1.05E−21 | | |
| | B | 9.68E−09 | E | 1.09E−16 | H | 1.96E−24 | | |
| S6 | K | −5.40649 | C | 2.03E−12 | F | 3.02E−19 | J | −1.5E−26 |
| | A | 6.15E−07 | D | −2.2E−14 | G | 4.3E−22 | | |
| | B | 4.6E−09 | E | −8.1E−17 | H | 4.8E−24 | | |
| S18 | K | 1.016429 | C | −9E−11 | F | −1.1E−18 | J | −6.1E−26 |
| | A | −1.1E−05 | D | −1.4E−13 | G | −8.1E−23 | | |
| | B | 7.21E−08 | E | 3.12E−16 | H | 3.86E−23 | | |

TABLE 2-continued

| Surface | | Aspheric coefficient | | | | | | | |
|---|---|---|---|---|---|---|---|---|---|
| S19 | K | 0.742868 | C | −2.3E−11 | F | 1.09E−19 | J | 9.02E−29 |
| | A | 1.52E−07 | D | −4.7E−14 | G | 1.62E−22 | | |
| | B | 2.1E−08 | E | 2.97E−17 | H | −3.1E−25 | | |

Although not listed in Table 2, the curvature "c" in numerical expression 1 is expressed as the reciprocal of the radius Rd in Table 1. Also, ". . . E−N" in each value listed above as an example, denotes ". . . ×$10^{-N}$." For example, coefficient A of the lens surface S5 is "−2.7881E", which indicates "−2.788× $10^{-06}$=−0.0000027881."

The rotationally asymmetric free-form curved shapes of the lens surfaces S20, S21 of the lens 13a and S22, S23 of the lens 13b that are marked with "*" in Table 1, in the rear group 13 of the projection lens section 2, are each represented by numerical expression 2 using a local orthogonal coordinate system whose origin is set up at the vertex (center) of each such surface through which the optical axis passes. The same also applies to the reflecting surface S24 of the free-form surface mirror 5.

$$Z = \frac{cr^2}{1+\sqrt{1-(1+k)c^2r^2}} + \sum_m \cdot \sum_n (C(m,n) \cdot x^m \cdot y^n)$$

[Numerical expression 2]

where
r: distance from (i.e., ray height above or below) the optical axis of the lens surface, on a plane that includes the vertex through which the optical axis passes, and is perpendicular to the optical axis,
Z: distance (sag) from a point present at the distance "r" from the optical axis on the above plane, to a point on the lens surface in a parallel direction to the optical axis,
c: curvature of the lens surface at the above vertex,
k: conical constant, and
C(m,n): coefficient of $x^m \cdot y^n$ at an x-y planar coordinate position (x, y) in the local cylindrical coordinate system mentioned above.

Those positions on one circumference with the optical axis as its center which are distanced through "r" from the optical axis differ from each other in terms of (x, y) coordinates. Hence, $\Sigma \cdot \Sigma(C(m,n)/x^m \cdot y^n$ also differs, which in turn generates a difference in sag Z according to the particular position. The surface shape represented by numerical expression 2, therefore, forms any rotationally asymmetric curved shape with respect to the optical axis. Such a rotationally asymmetric curved surface is termed "free-form surface" or "free-form curved surface" in the present embodiment. The curvature "c" of such a surface is also the reciprocal of the radius Rd in Table 1.

Table 3 lists specific values of the conical constant "k" and coefficients C(m.n) in numerical expression 2, plotted for the lens surfaces S20, S21 and S22, S23 of the rotationally asymmetric free-form surface lenses 13a and 13b, respectively, in the rear group 13 of the projection lens section 2, as well as for the reflecting surface S24 of the free-form surface mirror 5.

TABLE 3

| Surface | | | | Free-form surface coefficient | | | | | |
|---|---|---|---|---|---|---|---|---|---|
| S20 | | | C(4, 1) | 5.39E−07 | C(2, 5) | −1.2E−09 | C(4, 5) | −7.4E−14 |
| | K | 0 | C(2, 3) | 8.33E−07 | C(0, 7) | 1.14E−09 | C(2, 7) | 2.05E−12 |
| | C(2, 0) | 0.013501 | C(0, 5) | −4.6E−08 | C(8, 0) | 3.88E−12 | C(0, 9) | −9.2E−13 |
| | C(0, 2) | 0.003493 | C(6, 0) | −6.3E−09 | C(6, 2) | 1.05E−11 | C(10, 0) | −2.6E−15 |
| | C(2, 1) | −0.00084 | C(4, 2) | −2.2E−08 | C(4, 4) | 1.8E−11 | C(8, 2) | −8.7E−15 |
| | C(0, 3) | −0.00032 | C(2, 4) | −5.7E−08 | C(2, 6) | 5.23E−11 | C(6, 4) | 2.85E−14 |
| | C(4, 0) | 8.59E−06 | C(0, 6) | 9.7E−10 | C(0, 8) | 1.69E−11 | C(4, 6) | −8.5E−14 |
| | C(2, 2) | 2.15E−06 | C(6, 1) | −1.2E−10 | C(8, 1) | −2.7E−14 | C(2, 8) | 1.25E−13 |
| | C(0, 4) | 7.54E−06 | C(4, 3) | −1.4E−09 | C(6, 3) | 7.31E−13 | C(0, 10) | −5.6E−14 |
| S21 | | | C(4, 1) | 7.49E−07 | C(2, 5) | −5.7E−10 | C(4, 5) | −3.6E−13 |
| | K | 0 | C(2, 3) | 1.19E−06 | C(0, 7) | 1.27E−09 | C(2, 7) | 8.54E−14 |
| | C(2, 0) | 0.015489 | C(0, 5) | −1.3E−07 | C(8, 0) | −4.8E−12 | C(0, 9) | −5.3E−13 |
| | C(0, 2) | 0.006553 | C(6, 0) | 5.12E−10 | C(6, 2) | 7.33E−12 | C(10, 0) | 8.93E−17 |
| | C(2, 1) | −0.00117 | C(4, 2) | −2.2E−08 | C(4, 4) | 5.3E−11 | C(8, 2) | −5.3E−15 |
| | C(0, 3) | −0.00034 | C(2, 4) | −6E−08 | C(2, 6) | 5.05E−11 | C(6, 4) | 1.97E−14 |
| | C(4, 0) | 7.5E−06 | C(0, 6) | 2.04E−08 | C(0, 8) | −2.2E−11 | C(4, 6) | −1.4E−13 |
| | C(2, 2) | −2.6E−06 | C(6, 1) | 1.17E−11 | C(8, 1) | −1.3E−13 | C(2, 8) | 1.06E−13 |
| | C(0, 4) | −1.4E−06 | C(4, 3) | −1.6E−09 | C(6, 3) | 7.64E−13 | C(0, 10) | −4.7E−15 |
| S22 | | | C(4, 1) | −1E−07 | C(2, 5) | 2.82E−10 | C(4, 5) | −8.2E−15 |
| | K | 0 | C(2, 3) | 3.01E−08 | C(0, 7) | 6.06E−10 | C(2, 7) | 3.06E−14 |
| | C(2, 0) | 0.015097 | C(0, 5) | 7.96E−08 | C(8, 0) | 8.39E−13 | C(0, 9) | −9.2E−13 |
| | C(0, 2) | 0.009983 | C(6, 0) | −1.4E−09 | C(6, 2) | 1.99E−12 | C(10, 0) | −7.9E−17 |
| | C(2, 1) | 0.000358 | C(4, 2) | 9.33E−10 | C(4, 4) | 1.37E−11 | C(8, 2) | −9E−16 |
| | C(0, 3) | 0.000209 | C(2, 4) | 3.54E−09 | C(2, 6) | −1.1E−11 | C(6, 4) | −6.1E−15 |
| | C(4, 0) | −3.9E−07 | C(0, 6) | 4.16E−09 | C(0, 8) | 9.04E−12 | C(4, 6) | −2E−14 |
| | C(2, 2) | −6.8E−06 | C(6, 1) | −1.2E−11 | C(8, 1) | 2.48E−14 | C(2, 8) | 2.68E−14 |
| | C(0, 4) | −2.2E−05 | C(4, 3) | −2.3E−10 | C(6, 3) | 6.93E−14 | C(0, 10) | −1.4E−14 |
| S23 | | | C(4, 1) | −3.7E−07 | C(2, 5) | 4.8E−10 | C(4, 5) | −3E−13 |
| | K | 0 | C(2, 3) | −3.1E−07 | C(0, 7) | 1.43E−10 | C(2, 7) | −2.5E−14 |
| | C(2, 0) | 0.022814 | C(0, 5) | 4.12E−08 | C(8, 0) | −2.1E−12 | C(0, 9) | −3.9E−13 |
| | C(0, 2) | 0.012061 | C(6, 0) | 4.08E−09 | C(6, 2) | −4.9E−12 | C(10, 0) | 6.89E−16 |
| | C(2, 1) | 0.000639 | C(4, 2) | 8.6E−09 | C(4, 4) | −2.4E−12 | C(8, 2) | 1.55E−15 |
| | C(0, 3) | 0.000196 | C(2, 4) | 2.17E−08 | C(2, 6) | −2.2E−11 | C(6, 4) | −1.5E−15 |
| | C(4, 0) | −7.1E−06 | C(0, 6) | 1.63E−08 | C(0, 8) | −2.4E−12 | C(4, 6) | −1E−14 |
| | C(2, 2) | −1.3E−05 | C(6, 1) | 1.39E−10 | C(8, 1) | −5.7E−15 | C(2, 8) | 2.73E−14 |
| | C(0, 4) | −2.5E−05 | C(4, 3) | 2.02E−10 | C(6, 3) | −9E−14 | C(0, 10) | −1.2E−14 |
| S24 | | | C(4, 1) | −1.1E−09 | C(2, 5) | −4.9E−14 | C(4, 5) | −5.5E−19 |
| | K | 0 | C(2, 3) | −5.8E−10 | C(0, 7) | 8.13E−14 | C(2, 7) | −2.3E−18 |
| | C(2, 0) | 0.001597 | C(0, 5) | 1.6E−10 | C(8, 0) | −7.5E−17 | C(0, 9) | −3.6E−18 |
| | C(0, 2) | 0.001324 | C(6, 0) | 1.92E−12 | C(6, 2) | 6.81E−16 | C(10, 0) | 1.1E−21 |
| | C(2, 1) | 1.38E−05 | C(4, 2) | −1.1E−11 | C(4, 4) | −5.1E−17 | C(8, 2) | −2.2E−20 |
| | C(0, 3) | 1.34E−05 | C(2, 4) | −8.6E−12 | C(2, 6) | −3.7E−16 | C(6, 4) | 2.02E−20 |
| | C(4, 0) | −4.8E−08 | C(0, 6) | −1.1E−12 | C(0, 8) | 1.46E−15 | C(4, 6) | −1.2E−20 |
| | C(2, 2) | 5.24E−08 | C(6, 1) | 6.25E−14 | C(8, 1) | −2.2E−18 | C(2, 8) | 3.21E−21 |
| | C(0, 4) | 9.54E−08 | C(4, 3) | −3.4E−14 | C(6, 3) | 2.86E−18 | C(0, 10) | −1.5E−19 |

Since, as listed in Table 1, the surfaces S of these optical elements, listed in Table 3, all take infinite values as the respective radii Rd, the curvatures "c" of the surfaces S are all zero as listed in Table 3. The conical constant "k" is also zero in Table 3. Additionally, coefficients C(2, 0), C(0, 2), etc. are associated with those points (x, y) on the same circumference which take a constant "r" value. Table 3 lists coefficients associated with 34 points.

The values listed as examples in Table 3 are set up so that at the portion where the screen lower-edge ray L2 (see FIG. 2) heading for the lower edge R2 (also see FIG. 2) of the projection screen 3 is emitted, at least the free-form surface lens 13b in the rear group 13 decreases in emission angle and increases in curvature, and so that at the portion where the screen upper-edge ray L3 (in FIG. 2) heading for the upper edge R3 (in FIG. 2) of the projection screen 3 is emitted, at least the free-form surface lens 13b increases in emission angle and decreases in curvature.

The values listed in Table 3 are also set up so that at the portion where the screen lower-edge ray L2 (see FIG. 2) heading for the lower edge R2 (also see FIG. 2) of the projection screen 3 enters, the reflecting surface S24 of the free-form surface mirror 5 decreases in incident angle and increases in curvature, and so that at the portion where the screen upper-edge ray L3 (in FIG. 2) heading for the upper edge R3 (in FIG. 2) of the projection screen 3 enters, the reflecting surface S24 increases in incident angle and decreases in curvature.

In FIGS. 2 and 5A, 5B, on the other hand, in order to correct trapezoidal distortion on the projection screen 3 due to optical differences in optical path length between various points on the projection screen 3 and various associated points on the object surface 11, the display screen (object surface) 11 of the image display element is inclined with respect to a surface perpendicular to the optical axis of the projection lens section 2, as described previously. More specifically, if the normal to the central portion of the object surface 11 in FIG. 5A has a positive counterclockwise angle of inclination with respect to the optical axis of the projection lens section 2, on the Y-Z plane including the optical axis 10, and has a negative clockwise angle of inclination, the object surface 11 is inclined upward so that this normal on the Y-Z plane is inclined at an angle of −1.163° with respect to the optical axis 10 of the projection lens section 2, that is, inclined at 1.163° clockwise.

Also, suppose that a reflection point of the screen central ray L1 on the reflecting surface S24 of the free-form surface mirror 5 (i.e., the central portion of the reflecting surface S24) is taken as the coordinate origin of the local coordinate system of the X-, Y-, and Z-coordinates parallel to the X-, Y-, and Z-coordinate axes, respectively. In this case, the reflecting surface S24 is inclined with respect to the optical axis 10 so that as shown in FIG. 2, the normal at the origin of the local coordinate system (i.e., centrally on the reflecting surface S24) is inclined at a θm angle of +29° with respect to the optical axis from the projection lens section 2 to the origin, on the Y-Z plane of the local coordinate system. A counterclockwise inclination in this case is defined as a positive angle. The normal to the reflecting surface S24 of the free-form surface mirror 5, at the origin, therefore, is inclined at 29° upward (counterclockwise) with respect to the optical axis 10.

Image light that has been emitted from the object surface 11 inclined with respect to the optical axis 10, as described above, along the optical axis of the projection lens section 2, is passed therethrough and then the reflecting surface S24 of the free-form surface mirror 5 is irradiated. At the center of the reflecting surface S24 (i.e., the coordinate origin in the above local coordinate system), the screen central ray L1 enters from the projection lens section 2 at a clockwise angle of 29° with respect to the normal at that center, and the image light is reflected so that the screen central ray L1 is reflected at a counterclockwise angle of 29° with respect to the particular normal (i.e., so that the screen central ray L1 is reflected at a counterclockwise (upward) angle of 29°×=58° with respect to the incident optical path of the ray. The optical axis of the image light reflected on the reflecting surface S24 of the free-form surface mirror 5, therefore, is inclined at a counterclockwise angle twice as large as the inclination angle of 29° to the normal at the center of the reflecting surface S24 on the Y-Z plane, with respect to the optical axis of the image light irradiated onto the reflecting surface S24 (i.e., the optical axis 10 of the projection lens section 2). The particular optical axis becomes a new optical axis of the image light reflected by the free-form surface mirror 5. The ray passed through this new optical axis is the screen central ray L1.

The intersurface clearance TH of "–400.00" shown in Table 1 for the reflecting surface S24 denotes that the distance, along the optical axis of the image light, between the central portion of the reflecting surface S24 and the central portion Q1 of the reflecting surface S25 of the planar reflecting mirror 4 is 400 mm, the central portion Q1 being where the reflecting surface S25 is irradiated with the screen central ray L1 and then the ray L1 is reflected. The negative value of "–400.00" is shown because the reflecting surface S25 of the planar reflecting mirror 4 is closer to the object surface 11 than the reflecting surface S24 of the free-form surface mirror 5. The respective intersurface clearances TH of other surfaces S1-S24 and S25 take positive values since each of these surfaces is more distant from the object surface 11 than the immediately preceding surface in the traveling direction of the image light.

Table 4 lists inclination angles ADE (degrees) and magnitudes of eccentricity, YDE (mm), on the x-z planes of the local orthogonal coordinate systems relating to the reflecting surface S24, reflecting surface S25, and light projection surface S26 of the free-form surface mirror 5, planar reflecting surface S24, and projection screen 3, respectively, shown in FIG. 2. These local orthogonal coordinate systems take the central portions P1, Q1, R1 of the respective surfaces S as the respective origins, and the x-, y-, and z-axes of each local orthogonal coordinate system are parallel to the X-, Y-, and Z-axes, respectively, of the reference XYZ orthogonal coordinate system.

TABLE 4

| Surface | ADE (°) | YDE (mm) |
|---------|---------|----------|
| S0      | –1.163  | 0.0      |
| S24     | 29.000  | 0.0      |
| S25     | –43.000 | 0.0      |
| S26     | 30.000  | 0.0      |

In Table 4, inclination angle ADE is expressed as the angle of incidence of the screen central ray L1 to the normal at the point of incidence of the ray L1 on a surface S in the local orthogonal coordinate system thereof. If the angle of incidence to the normal is inclined clockwise, the angle of incidence takes a positive value. Conversely, the angle of incidence takes a negative value if inclined counterclockwise.

The magnitude of eccentricity, YDE, indicates a magnitude of a vertical (y-axial) deviation of the screen central ray L1 on a surface S, from a central point of incidence of the ray L1. Downward eccentricity from the central point is expressed as a positive value, and upward eccentricity from the central point is expressed as a negative value. In Table 4, the magnitude of eccentricity, YDE, of each surface S is set equal to zero (no eccentricity).

In the present embodiment, the inclinations and eccentricity of all optical elements are set with respect to the direction in the y-z plane.

As listed in Table 3, the curvature "c" and conical constant "k" of the rotationally asymmetric free-form curved surface represented using numerical expression 2 are both defined as zero. Trapezoidal distortion due to oblique incidence of light on the projection screen 3 occurs at an extremely high level in the oblique direction of incidence, and the sag in a direction perpendicular to the direction of incidence is small. An independent function for conducting significantly different corrections is therefore required for each of the corrections in the oblique direction of incidence and in the direction perpendicular thereto. Accordingly, asymmetric aberration can be properly corrected by not using the above-mentioned curvature "c" and conical constant "k" that function in all directions with rotational symmetry.

The data listed in Tables 1 to 4 is one specific example of the data used when an image that measures 16 mm horizontally and 9 mm vertically on the object surface 11 is to be projected onto the projection screen 3 at an image size of 1,452.8 mm horizontally and 817.2 mm vertically.

Figure 6:
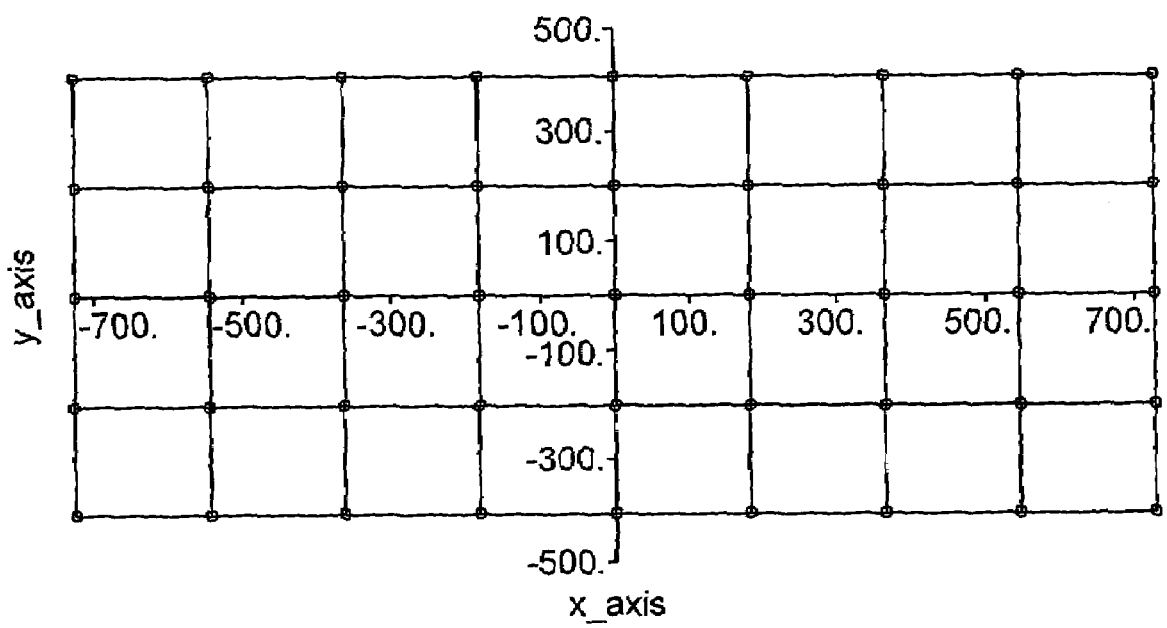
FIG. 6 is a diagram that shows the graphical distortion of the onscreen projected image in the state where each optical element in the embodiment of FIG. 1 is set to the values listed in Tables 1 to 4.

FIG. 6 is a diagram that shows the graphical distortion of the projected image on the projection screen 3, observed in the present embodiment of the configuration of FIGS. 2 to 5A, 5B when the data in Tables 1 to 4 is assigned to each optical element. In FIG. 6, a vertical direction is taken as the vertical direction of the projection screen 3 (i.e., the same direction as that of the Y-axial short side), and a horizontal direction is taken as the horizontal direction of the projection screen 3 (i.e., the same direction as that of the X-axial long side).

When an image indicative of five straight lines for splitting a rectangular screen of a 16:9 aspect ratio into four vertical segments, and of nine straight lines for splitting the rectangular screen into eight horizontal segments, is displayed on the display screen 11 and then projected in enlarged form onto the projection screen 3, graphical distortion of the image can be observed from a state of bending of the lines displayed. FIG. 6 shows the image projected onto the projection screen 3 at that time, and a crossing point of the lines displayed centrally in both vertical and horizontal directions is a central point of the screen. In this projected image, almost no graphic distortion is observed, which indicates that high performance free from distortion such as trapezoidal distortion can be obtained.

Figure 7:
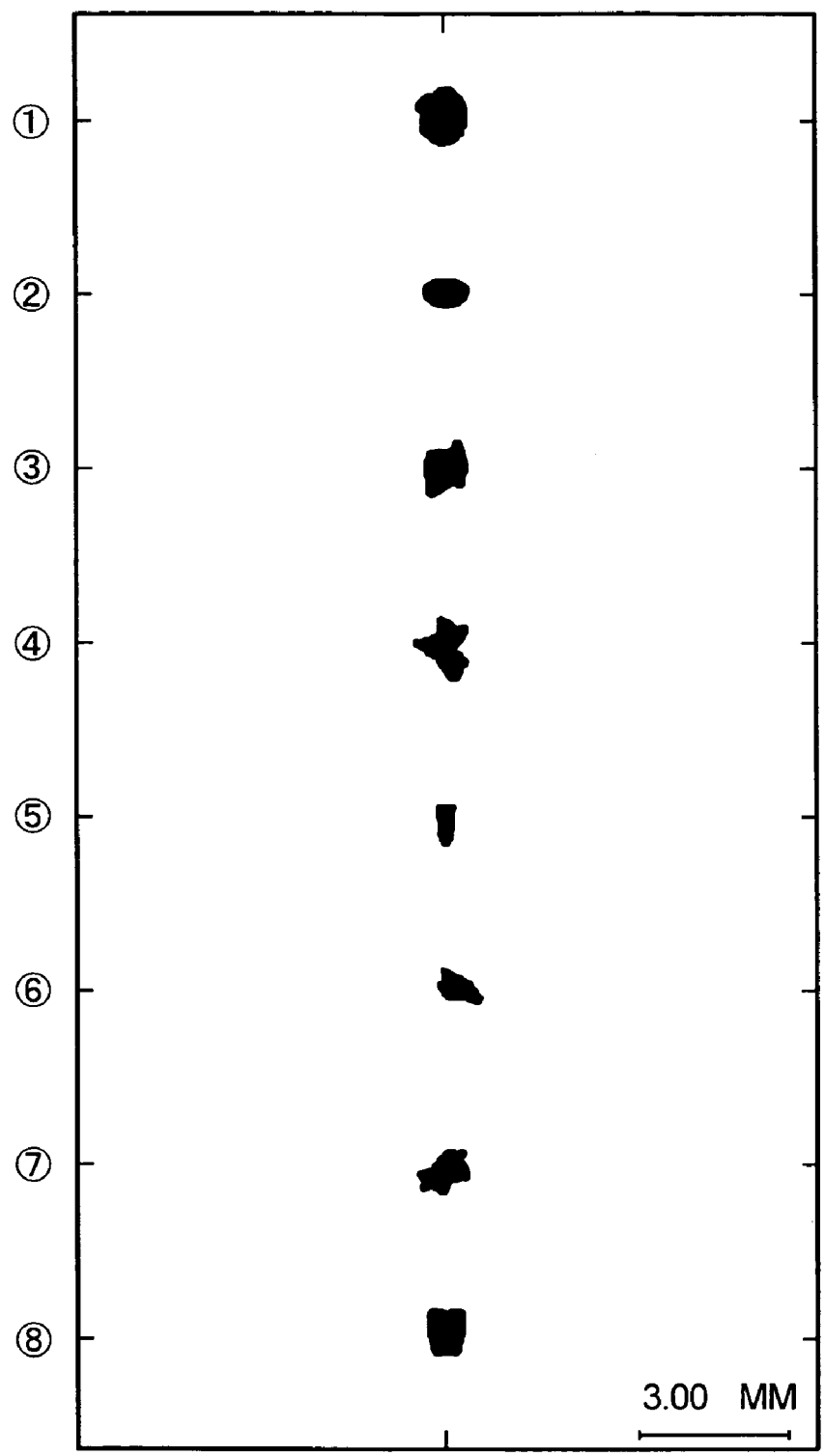
FIG. 7 is a spot diagram that shows spots observed at various points on a projection screen in the embodiment of FIG. 1.

FIG. 7 is a spot diagram that shows spots observed at various points on the projection screen 3 in the present embodiment.

The X,Y coordinate positions on the projection screen 3 in this case are shown in FIG. 6, and a spacing between the horizontal lines is expressed as 2 in terms of X-coordinate value. A spacing between the vertical lines is also expressed as 2 in terms of Y-coordinate value. A crossing point of the lines displayed centrally in both vertical and horizontal directions is a central point of the screen, and this position is taken as an origin (0, 0) in the XY coordinate system. Therefore, X-coordinates of crossing points of the X-axial lines themselves are −8, −6, −4, −2, 0, 2, 4, 6, and 8, and Y-coordinates of crossing points of the Y-axial lines themselves are −4, −2, 0, 2, and 4.

Fluxes of light that have been emitted from eight coordinate points of (8, 4, 5), (0, 4, 5), (4, 8, 2, 7), (8, 0), (0, 0), (4, 8, −2, 7), (8, −4, 5), (0, −4, 5) in an XY coordinate system corresponding to the above display screen 11 are used to display spots at corresponding points on the projection screen 3. FIG. 7 shows the spot diagram in which the spots are lined up vertically in the order of the above points. The spots are expressed in metric units (mm).

In this spot diagram, favorable spots are obtained at each point, and this indicates that the asymmetric aberration of the image surface, such as distortion, is properly corrected.

As described above, in the present embodiment, the optical systems for projecting the image on the display screen 11 onto the projection screen 3 consist of the first optical system including the rear group 13 of the projection lens section 2 that uses the free-form surface lens having a rotationally asymmetric free-form curved lens surface, and the second optical system using the free-form surface mirror 5 which has a rotationally asymmetric free-form curved reflecting surface. The rear group 13 of the projection lens section 2 and the free-form surface mirror 5 are each assigned independently. That is to say, the second optical system primarily corrects trapezoidal distortion of the image surface on the projection screen 3, and the rear group 13 of the projection lens section 2 which is the first optical system primarily corrects asymmetric aberration such as the distortion of the image surface on the projection screen 3.

Figure 8:
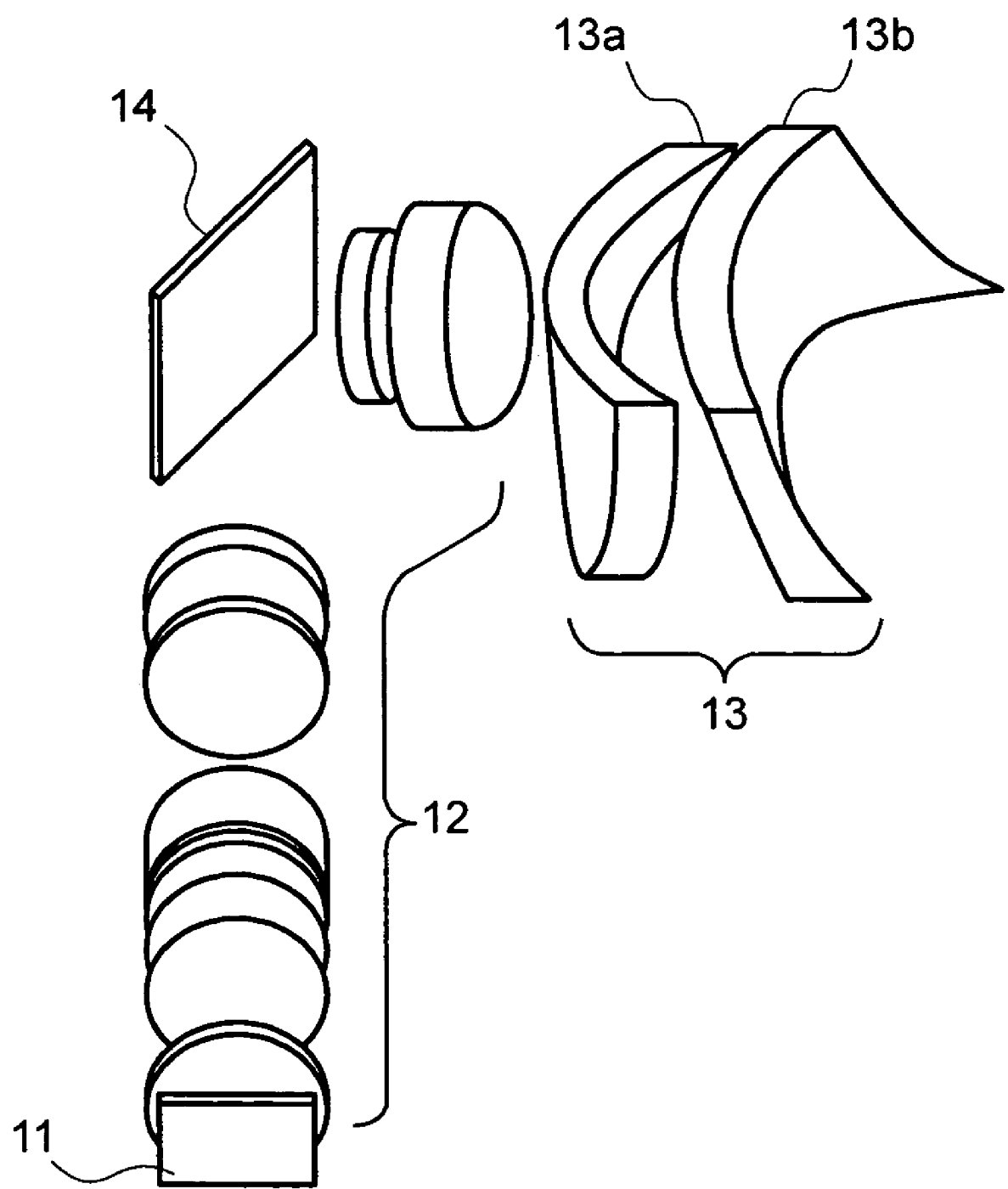
FIG. 8 is a perspective view that shows lens groups of the projection lens section constituting a projection optical unit in the embodiment of FIG. 1.

FIG. 8 is a perspective view that shows the lens groups of the projection lens section 2 constituting a projection optical unit in the present embodiment, wherein sections equivalent to those of the relevant previous drawing are assigned the same reference numbers or symbols as used in FIG. 8.

In FIG. 8, the front group 12 of the projection lens section 2 is a main lens for projecting the image on the display screen 11 of the image display element onto the projection screen 3. The front group 12 is constituted by a plurality of refracting lenses each having a lens surface of a rotationally symmetric shape, and the front group 12 primarily corrects basic aberration in the rotationally symmetric optical system. The rear group 13 of the projection lens section 2 includes a rotationally asymmetric free-form surface lens and primarily corrects the aberration caused by oblique incidence of light on the projection screen 3.

While the rear group 13 in FIG. 8 is constructed of, as an example, a combination of two free-form surface lenses, 13a, 13b, the rear group 13 may use three or more free-form surface lenses. In both cases, however, at least one free-form surface lens in the rear group 13 is totally curved to form a concave shape with respect to the direction of light emitted from the lens. The curvature of a section on the free-form surface lens (in this example, a lower section of the free-form surface lens) where the screen lower-edge ray L2 (see FIG. 2) heading for the lower edge R2 (also see FIG. 2) of the projection screen 3 is emitted at a small exit angle is greater than the curvature of a section on the free-form surface lens (in this example, an upper section of the free-form surface lens) where the screen upper-edge ray L3 (in FIG. 2) heading for the upper edge R3 (in FIG. 2) of the projection screen 3 is emitted at a great exit angle. This example also assumes that the refractive mirror 14 is disposed midway in the front group 12.

In the meantime, a concentric lens barrel has traditionally been used to fix a lens group of an imaging optical system to a required position. This is natural because the lens group of the imaging optical system has included a plurality of refracting lenses each having a rotationally symmetric surface shape. Of the entire lens group, only lenses made of plastics repeat expansion or contraction, depending on temperature and relative humidity. In particular, the acrylic resin (PMMA) most commonly used in lenses of this kind greatly expands by moisture absorption, so the lens barrel includes such an element that absorbs the expansion and contraction of a lens ball. Plastic barrels are constructed so that the barrel itself deforms. For metallic barrels, a spacer that elastically deforms is disposed around the lens and retains a lens ball around an optical axis, regardless of whether a plastic lens expands or contracts.

As shown in FIG. 8, in the present embodiment, the rear group 13 of the projection lens section 2 includes rotationally asymmetric free-form surface lenses 13a, 13b, and for this reason, a concentric lens barrel cannot be used. To enable these lenses mainly to correct any aberration caused by oblique incidence of light, it does not always suffice just to retain a lens ball around an optical axis, as with the front group 12 of the projection lens section 2 that corrects basic aberration in rotationally symmetric optics.

Figure 9:
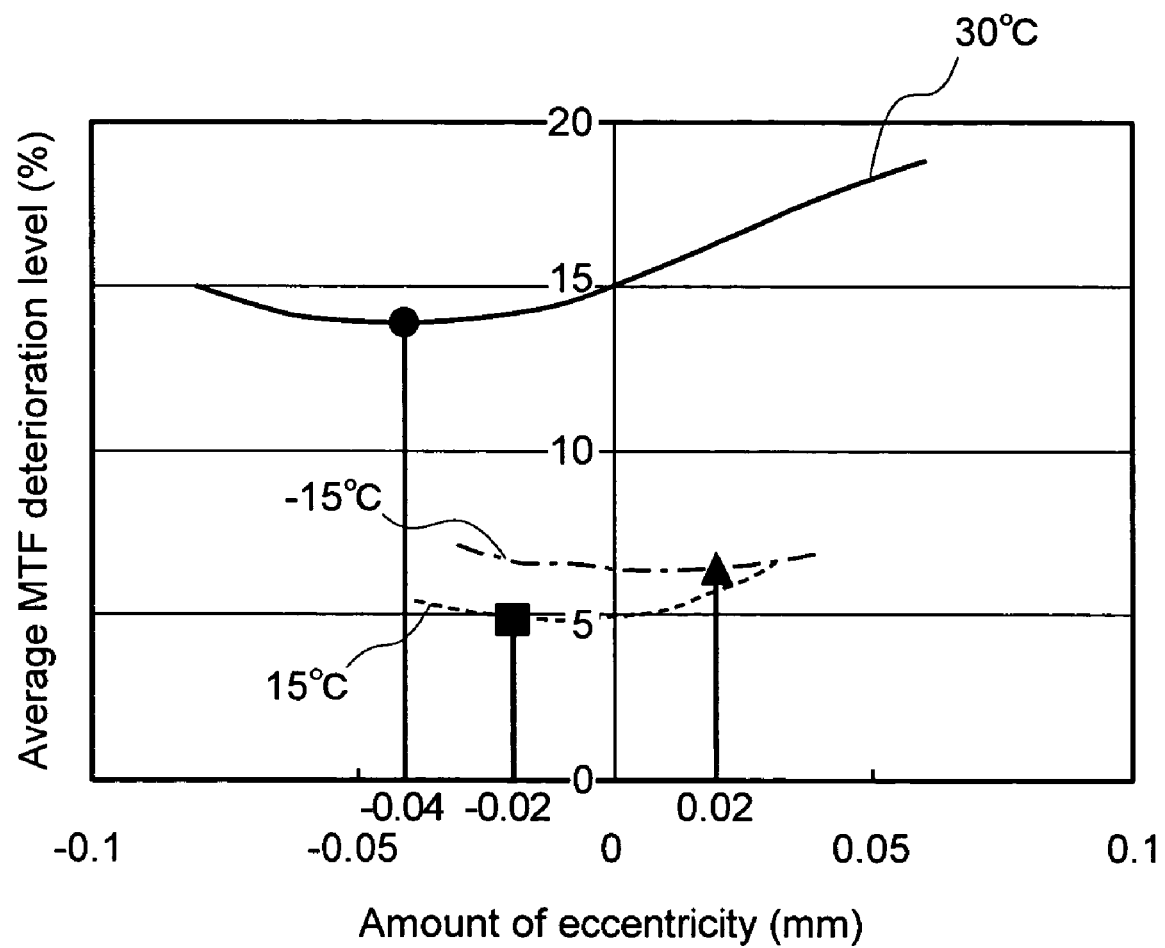
FIG. 9 is a diagram that shows changes in a deterioration level of focusing performance according to temperature changes of the projection lens section in the embodiment of FIG. 1.

FIG. 9 is a diagram that shows changes in a deterioration level of focusing performance (hereinafter, referred to as MTF: Modulation Transfer Function) according to particular temperature changes of the projection lens section 2. Changes in the amount of Y-axial eccentricity are plotted on a horizontal axis.

In FIG. 9, a solid line, a broken line, and a single-dotted line denote average MTF deterioration levels for a 30° C. temperature rise, a 15° C. temperature rise, and a −15° C. temperature drop, respectively. These results relate to the outermost free-form surface lens 13b (see FIG. 8) in the rear group 13 of the projection lens section 2. The same tendency also occurs with the free-form surface lens 13a (also see FIG. 8) located internally to the outermost free-form surface lens 13b, or with the free-form surface mirror 5 (see FIG. 2) that is the second optical system.

For the projection lens that corrects the basic aberration in rotationally symmetric optics, the MTF deterioration level is minimized when the amount of eccentricity is zero. For the rotationally asymmetric free-form surface lens that corrects the aberration caused by the oblique incidence of light, however, the MTF deterioration level is minimized when the amount of eccentricity is other than zero, as shown in FIG. 9. At 30° C., for example, the MTF deterioration level is minimized when the amount of eccentricity is −0.04 mm. At 15° C., the MTF deterioration level is minimized when the amount of eccentricity is −0.02 mm. At −15° C., the MTF deterioration level is minimized when the amount of eccentricity is 0.02 mm.

The free-form surface lens 13b in the rear group 13 of the projection lens section 2 expands by 0.08 mm vertically (Y-axially) for a 30° C. temperature rise. Theoretically, since a dimension of the lens at its center is used as a reference value for measurement of expansion, A half of that dimension, 0.044 mm, becomes a magnitude of the expansion. Causing 0.04 mm eccentricity at 30° C., therefore, means that the upper edge of the lens is to be used as a reference edge to expand/contract the lens.

Figure 10A:
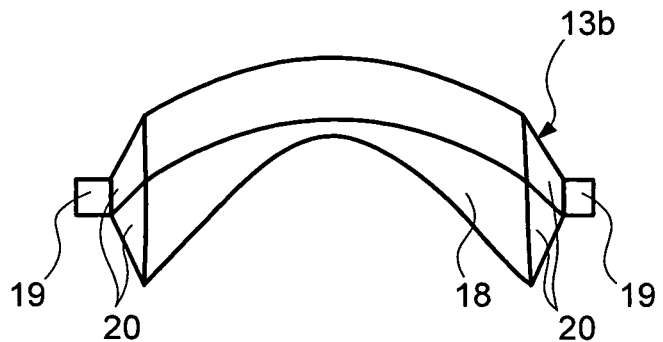
FIGS. 10A-10C are structural views each showing a more specific example of the outermost free-form surface lens included in a rear group of the projection lens section in FIG. 8.
Figure 10B:
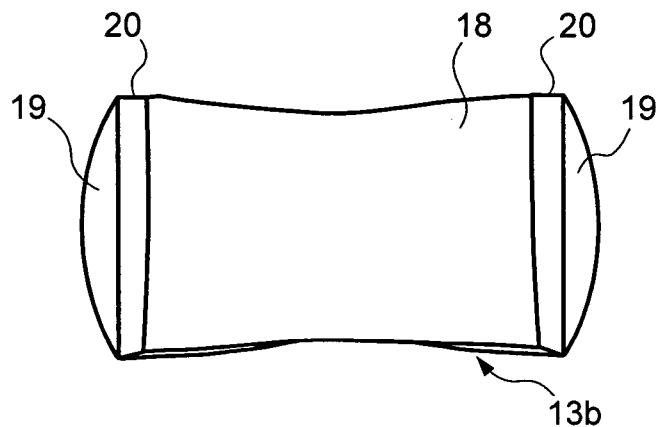
Figure 10C:
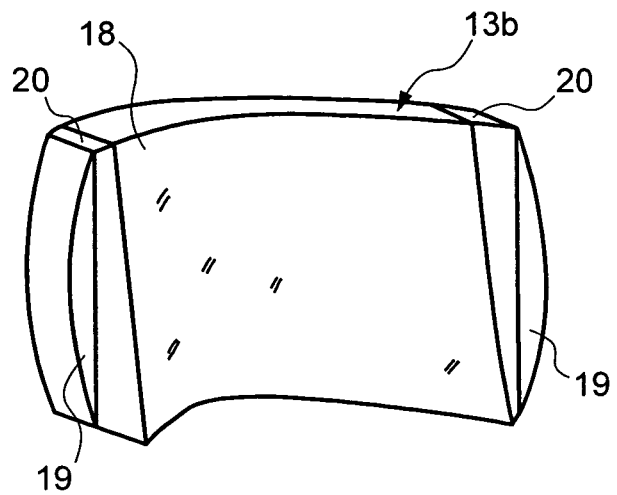

FIGS. 10A-10C are views showing the outermost free-form surface lens 13b included in the rear group 13 of the projection lens section 2 in FIG. 8. FIG. 10A is a top view, FIG. 5B is a front view, and FIG. 5C is a perspective view. Reference numbers 18, 19, and 20 in FIGS. 10A-10C denote an emission surface of light from the lens, a convex edge of the lens, and a horizontal reference edge, respectively.

As is obvious from FIG. 10B, the convex edge 19 of the free-form surface lens 13b forms part of a circular cylinder with the lens center as its central axis. The reason is described below.

Plastic lenses are generally produced by molding a plastic material using dies. The dies for lens molding are subjected to additional corrective machining for desired surface accuracy of the lens, and the correction amount required for the correction is calculated from the differences between the actual surface accuracy and design value of the lens to be molded. That is to say, a need arises to measure the surface accuracy of the lens precisely.

The lenses in the rear group 13 of the projection lens section 2 in the present embodiment are constituted by free-form curved surfaces. If a surface or edge is not used as a reference for measurement, the surface shapes of these lenses cannot be measured precisely. This is why the convex edge 19 and horizontal reference edge 20 are provided that both have such a cylindrical piece shape as shown in FIG. 10. This shape partly employs a cylindrical lateral face shape similar to that of a conventional lens. The convex edge 19 of the cylindrical piece shape does not need to be disposed on the entire surface of the free-form surface lens 13b. As shown in the figure, this convex edge may be provided at one section including the center of the lens. In that case, the convex edge 19 is preferably provided so as to be perpendicular to the optical axis (central axis of the ray exit surface 18) of the lens and so that the center of the lens matches that of the circular cylinder including the edge 19. The convex edge 19 of the cylindrical piece shape restricts the center of the lens and the surface perpendicular to the optical axis, and the horizontal reference edge 20 defines a horizontal surface. Measurement of the lens and setup of its installation attitude in a lens barrel become possible as a result.

Figure 11:
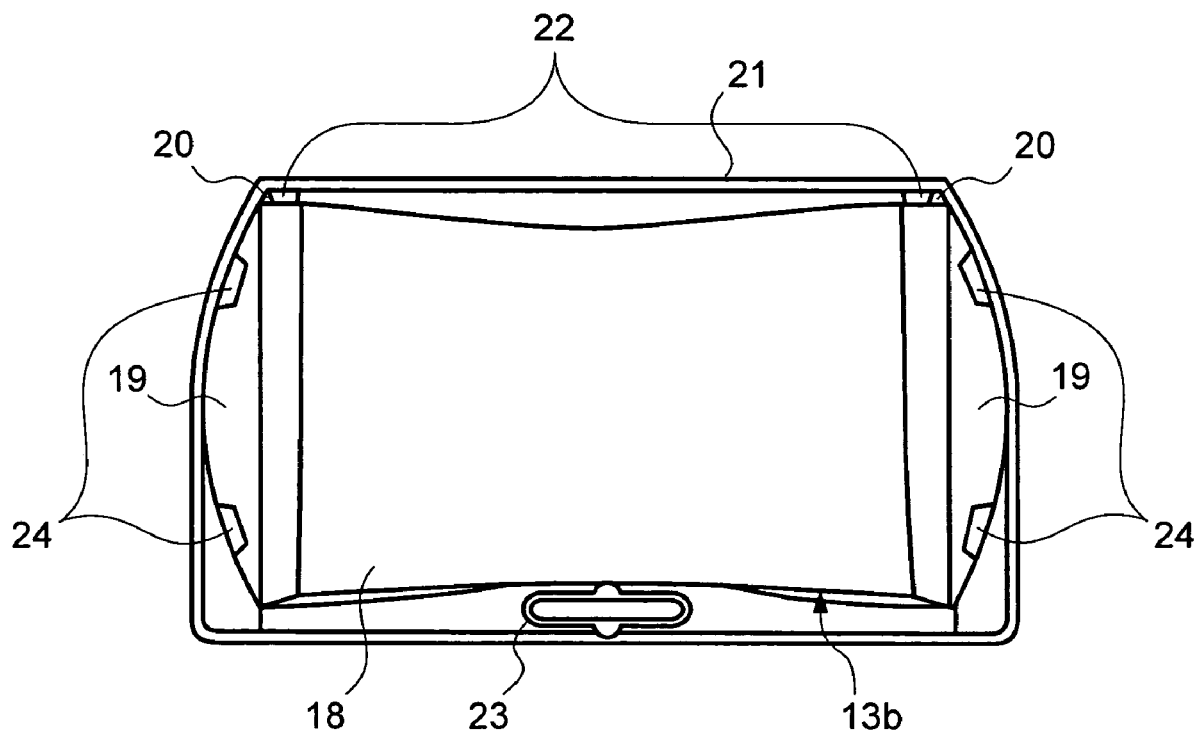
FIG. 11 is a front view of the free-form surface lens of FIG. 10, showing the lens fixed to a lens barrel.

FIG. 11 is a front view of the free-form surface lens 13b of FIG. 10, showing the state where the lens is installed and fixed to the lens barrel when the lens is viewed along the optical axis. In FIG. 11, reference number 21 denotes a lens barrel, 22 a horizontal reference edge support, 23 a retaining spring, and 24 a lens hold member. In order to avoid descriptive overlapping, constituent elements equivalent to those of FIG. 10 are assigned the same reference numbers as used therein.

As shown in FIG. 11, the free-form surface lens 13b is installed in a fixed condition in the barrel 21. A cross section of the barrel 21 does not form a shape of the convex edge 19 of the free-form surface lens 13b. Instead, the cross section forms such a shape as to be tangent only to an upper half of the edge 19. Whereas a conventional lens barrel centers an optical axis by supporting the entire edge surface of a cylindrical shape, the barrel in the present embodiment is adapted to be tangent only to the upper half of the edge 19. With this alone, however, the free-form surface lens 13b cannot be supported in a positioned condition.

In the present embodiment, therefore, the free-form surface lens 13b itself has the horizontal reference edge 20, and the edge of the barrel 21 that faces the horizontal reference edge 20 includes the horizontal reference edge support 22 and the retaining spring 23 for supporting a central portion of an opposite end (lower end) of the free-form surface lens 13b with respect to the horizontal reference edge 20. Additionally, an upper end extending from the horizontal reference edge 20 is used as a reference edge, and the above-mentioned lower end at the opposite side is used as a movable edge. The retaining spring 23 and the above-mentioned upper and lower ends are used to position and retain the free-form surface lens 13b appropriately in the barrel 21. The free-form surface lens 13b is fixed in a direction perpendicular to the optical axis (i.e., the axis perpendicular to the ray exit surface 18) by providing the lens hold member 24 in the barrel 21. This fixing method is essentially the same as the conventional method.

Adopting the above method of fixing the free-form surface lens 13b to the barrel 21 renders the horizontal reference edge 20 usable as a reference for the free-form surface lens 13b to expand/contract according to the particular temperature/relative humidity. As the free-form surface lens 13b expands/contracts, the movable edge moves vertically, thus minimizing the focusing performance deterioration level described above.

Figure 12:
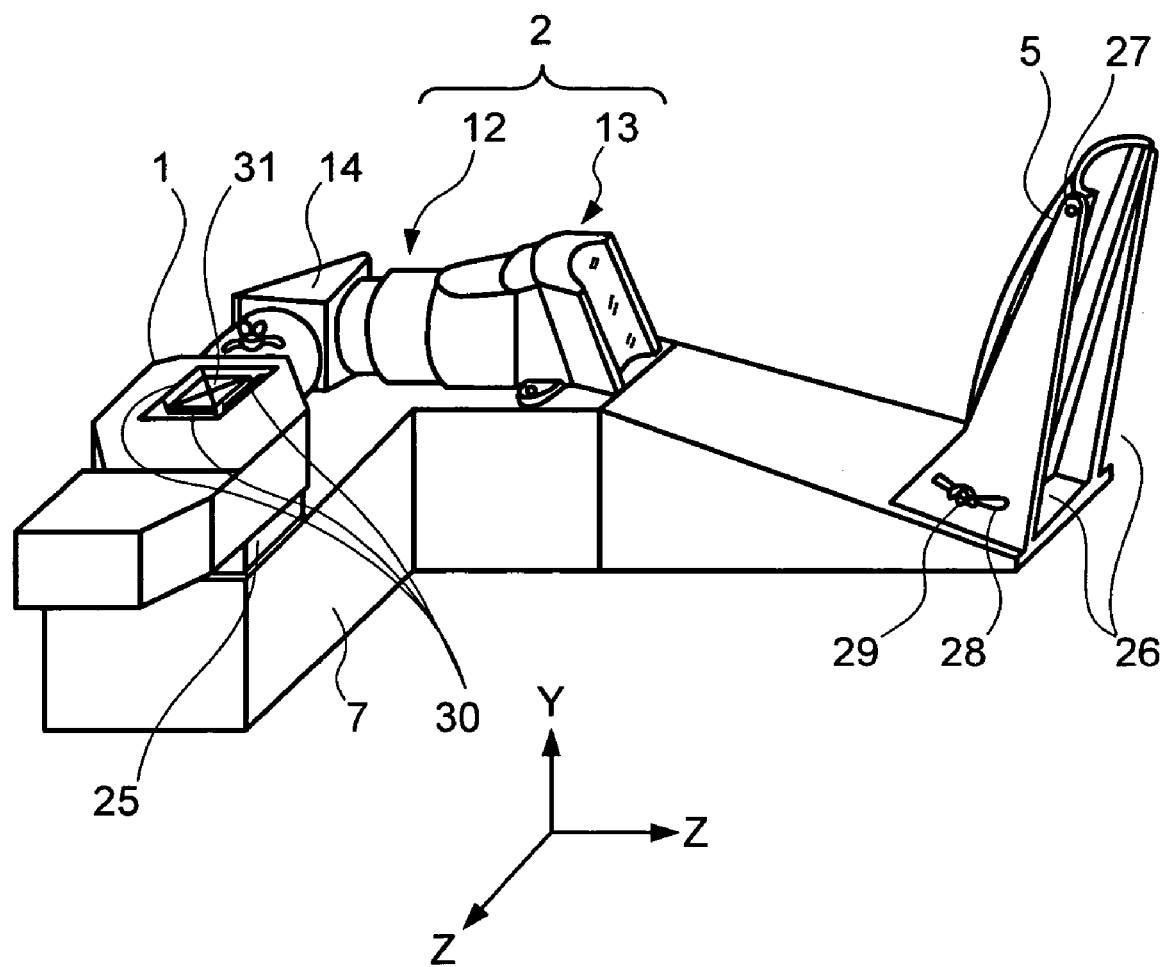
FIG. 12 is a view showing a more specific example of the projection optical unit in FIG. 1.

Although the above description relates to the free-form surface lens 13b located at the outermost position (exit side) of the rear group 13 in the projection lens section 2, the above description can also be applied to the free-form surface mirror 5 that is the second optical system, as well as to the free-form surface lens 13a located internally to the free-form surface lens 13b. Hereunder, further details of the free-form surface mirror 5 will be described using FIG. 12 which shows a more specific example of the projection optical unit in the present embodiment described in FIG. 1. In FIG. 12, reference number 25 denotes an adjuster, 26 a support fitting, 27 a pin for a central axis of rotation, 28 a rotation guide groove, 29 a fixing butterfly nut, 30 a transmissive liquid crystal panel, and 31 a cross dichroic prism. In order to avoid descriptive overlapping, constituent elements equivalent to those used in the relevant previous drawing are assigned the same reference numbers as used therein.

An image generator 1 in FIG. 12 uses three liquid crystal panels of a transmission type, as an example. Instead, the image generator 1 may use liquid crystal panels of a reflection type. Alternatively, the image generator 1 may use a display element including a plurality of micromirrors. The example in FIG. 12 assumes that the image generator 1 uses three transmission-type liquid crystal panels 30 applicable to representation of red, green, and blue.

Red, green, and blue rays of image light from the three transmission-type liquid-crystal panels 30 are synthesized by the cross dichroic prism 31 and then emitted as color image light. A projection lens section 2 has a refractive mirror 14 midway in a front group 12, as in the configuration described previously. A free-form surface mirror 5 in a second optical system is integrated with the image generator 1 and a projection lens section 2 and fixed to an optics base 7 which is an optics support body. Of all optical elements fixed to the optics base 7, only the projection lens section 2 is rigidly fixed before being integrated with the above-mentioned optical components. The image generator 1 is fixed to the optics base 7 such that at least vertical inclination (an axis parallel to an X-axis in an X-Y plane is taken as a rotational center), longitudinal (Z-axial) movement, and a distance between a ray exit side of the image generator 1 and a front group 12 of the projection lens section 2 can be adjusted via the adjuster 25.

In addition, the free-form surface mirror 5 is fixed using the support fitting 26 on the optics base 7 so as to be rotatable with an upper edge of the free-form surface mirror 5 as a central axis. The pin 27 for the central axis of the rotation holds an upper portion of the free-form surface mirror 5 from both ends thereof so that the mirror 5 can be rotated. The free-form surface mirror 5 is rotatably fixed with the pin 27 as its rotational axis. The free-form surface mirror 5 has its lower edge coupled with the fixing butterfly nut 29 via the rotation guide groove 28. Sliding the fixing butterfly nut 29 along the rotation guide groove 28 moves the lower edge of the free-form surface mirror 5, thus making the mirror 5 rotatable with the pin 27 as its central axis. An inclination angle of the free-form surface mirror 5 is thus adjusted. This adjustment makes it possible to conduct highly accurate correction of any trapezoidal distortion of a projected image on a projection screen 3 due to oblique projection.

The fixing butterfly nut 29 is fixed using friction. Dimensional change rates of expansion and contraction of the free-form surface mirror 5 due to changes in temperature/relative humidity can be absorbed by interposing a resilient body (not shown) between the free-form surface mirror 5 and the rotation guide groove 28. Using this method to install the free-form surface mirror 5 in the support fitting 26 makes the upper edge of the mirror 5 serve as a fixed end (reference edge) and makes the lower edge serve as a free end (movable edge). When the free-form surface mirror 5 expands/contracts according to particular temperature/relative humidity, the pin 27 for the central axis of rotation serves as a reference for the expansion/contraction, whereby a focusing performance deterioration level can be minimized as in the configuration described previously.

Based on the assumption that an image is obliquely projected upward from a lower section of the projection screen 3, the present embodiment has been described above in connection with the method of minimizing the deterioration level of focusing performance when the free-form surface lens 13*b* and the free-form surface mirror 5 expand/contract according to particular temperature/relative humidity. In the present invention, however, the image may be obliquely projected downward from an upper section of the projection screen 3. In this case, the reference edges for the free-form surface lens 13*b* and the free-form surface mirror 5 are replaced by lower edges conversely to the above case. In other words, a reference edge for fixing an optical element which has a free-form curved surface is a vertical edge present at the side where the light having a large incident angle to the projection screen 3 is passed. The reason is that if the angle of incidence of the light is large, even a slight displacement of the refraction surface (reflection surface) causes the light to deviate from a reference position. For an optical element having a free-form curved surface, therefore, any displacements of the section at which the light enters at a great angle need to be minimized by using this section as a reference edge.

While the above-described embodiment assumes an optical system configuration having both a free-form surface lens and a free-form surface mirror, the present invention may employ an optical system configuration having either a free-form surface lens or a free-form surface mirror. In this case, advantageous effects similar to those of the above embodiment can be obtained. In addition, the free-form surface mirror does not need to have a completely free-form curved surface and may be a mirror formed by extracting a portion of a spherical or non-spherical surface.

Furthermore, according to the embodiment described above, it is possible to realize a rear-projection color image display reduced in depth of its set and easy to assemble and adjust. Moreover, the image display can be changed into a front-projection image display by removing the planar reflecting mirror 4 (see FIG. 2) from the optical system configuration and then storing all device components from the display screen 11 of the image display element to the free-form surface mirror 5 into one device. In that case, a compact front-projection image display can be realized with a short path from the device to the projection screen.

What is claimed is:

1. A projection type image display for projecting, in enlarged form onto a projection screen, an image displayed on a display screen of an image display element, the display comprising:

a first optical system including a plurality of lenses for enlarging the image displayed on the display screen; and a second optical system that causes image light of the image from the first optical system to reflect and then enter the projection screen at a required angle with respect to a normal of the projection screen;

wherein the first optical system includes at least one asymmetric lens whose surface shape is concave in an emission direction of the light and rotationally asymmetric with respect to an optical axis, the asymmetric lens being installed in a lens barrel such that among the edges of the lens in the vertical direction of the lens, one edge from which the image light is emitted to the second optical system at a large angle is used as a reference edge, and such that the other edge from which the image light is emitted to the second optical system at a small angle is used as a movable edge;

wherein the second optical system includes at least one convex mirror whose reflection surface has at least one portion forming a convex shape in a direction of the reflection; and wherein the first optical system includes a projection lens formed of a plurality of lenses including the asymmetric lens, the projection lens being adapted to include not only a front group that includes a lens of a surface shape symmetric to an optical axis, but also a rear group that includes the asymmetric lens.

2. A projection type image display according to claim 1, wherein:

a lens is installed in an optics support unit such that among convex edges of the lens in the vertical direction of the lens, one edge from which the image light is emitted to the second optical system at a large angle is used as a reference edge, and such that the other edge from which the image light is emitted to the second optical system at a small angle is used as a movable edge.

3. A projection type image display for projecting, in enlarged form onto a projection screen, an image displayed on a display screen of an image display element, the display comprising:

a first optical system including a plurality of lenses for enlarging the image displayed on the display screen; and a second optical system that causes image light of the image from the first optical system to reflect and then enter the projection screen at a required angle with respect to a normal of the projection screen;

wherein the first optical system includes at least one asymmetric lens whose surface shape is concave in an emission direction of the light and rotationally asymmetric with respect to an optical axis, the asymmetric lens being installed in a lens barrel such that among the edges of the lens in the vertical direction of the lens, one edge from which the image light is emitted to the second optical system at a large angle is used as a reference edge, and such that the other edge from which the image light is emitted to the second optical system at a small angle is used as a movable edge;

wherein the second optical system includes at least one convex mirror whose reflection surface has at least one portion forming a convex shape in a direction of the reflection; and wherein the asymmetric lens is constructed such that among the edges of the lens in the vertical direction of the lens, one edge from which the image light is emitted to the second optical system at a large angle has a curvature smaller than a curvature of the other edge from which the image light is emitted to the second optical system at a small angle.

4. A projection type image display for projecting, in enlarged form onto a projection screen, an image displayed on a display screen of an image display element, the display comprising:

a first optical system including a plurality of lenses for enlarging the image displayed on the display screen; and a second optical system that causes image light of the image from the first optical system to reflect and then enter the projection screen at a required angle with respect to a normal of the projection screen;

wherein the first optical system includes at least one asymmetric lens whose surface shape is concave in an emission direction of the light and rotationally asymmetric with respect to an optical axis, the asymmetric lens being installed in a lens barrel such that among the edges of the lens in the vertical direction of the lens, one edge from which the image light is emitted to the second optical system at a large angle is used as a reference edge, and such that the other edge from which the image light is emitted to the second optical system at a small angle is used as a movable edge;

wherein the second optical system includes at least one convex mirror whose reflection surface has at least one portion forming a convex shape in a direction of the reflection; and wherein the second optical system includes a planar mirror for reflecting the image light that has been reflected by the convex mirror, and then guiding the reflected image light to the projection screen.

5. A projection type image display for projecting, in enlarged form onto a projection screen, an image displayed on a display screen of an image display element, the display comprising:

a first optical system including a plurality of lenses for enlarging the image displayed on the display screen; and a second optical system that causes image light of the image from the first optical system to reflect and then enter the projection screen at a required angle with respect to a normal of the projection screen;

wherein the first optical system includes at least one asymmetric lens whose surface shape is concave in an emission direction of the light and rotationally asymmetric with respect to an optical axis, the asymmetric lens being installed in a lens barrel such that among the edges of the lens in the vertical direction of the lens, one edge from which the image light is emitted to the second optical system at a large angle is used as a reference edge, and such that the other edge from which the image light is emitted to the second optical system at a small angle is used as a movable edge;

wherein the second optical system includes at least one convex mirror whose reflection surface has at least one portion forming a convex shape in a direction of the reflection; and wherein the convex mirror is constructed such that among the edges of the mirror in the vertical direction of the mirror, one edge on which the image from the first optical system is incident at a large angle has a curvature smaller than a curvature of the other edge on which the image light from the first optical system is incident at a small angle.

6. A projection type image display for projecting, in enlarged form onto a projection screen, an image displayed on a display screen of an image display element, the display comprising:

a first optical system including a plurality of lenses for enlarging the image displayed on the display screen; and a second optical system that causes image light of the image from the first optical system to reflect and then enter the projection screen at a required angle with respect to a normal of the projection screen;

wherein:

the first optical system includes a projection lens equipped with a front group inclusive of coaxial optics having a surface of a shape symmetric to an axis which passes through a substantially central portion of the display screen, and with a rear group inclusive of at least one free-form surface lens whose one or both surfaces take a free-form surface shape, the projection lens being adapted such that the image displayed on the display screen will be projected in enlarged form onto the projection screen;

the second optical system includes at least one free-form surface mirror of a free-form surface shape, the second optical system projecting the enlarged image from the projection lens onto the projection screen from an oblique direction; and among the edges of the free-form surface lens in the vertical direction of the lens, one edge from which the image light is emitted to the second optical system at a large angle is installed as a reference edge in a lens barrel, and the other edge from which the image light is emitted to the second optical system at a small angle is installed as a movable edge in the barrel by use of a spring or a resilient body.

7. A projection type image display according to claim 6, wherein:

the free-form surface mirror is constructed such that among the edges of the mirror in the vertical direction of the mirror, one edge on which the image light from the first optical system is incident at a large angle is installed as a reference edge, in a position of an optics support unit, and such that the other edge on which the image light from the first optical system is incident at a small angle is installed as a movable edge, in another position of the optics support unit.

8. A projection type image display according to claim 7, wherein:

the free-form surface mirror includes a mechanism for rotating the mirror about an edge at which an angle of incidence of the image light from the first optical system is larger than that of the other edge.

9. A projection type image display according to claim 6, wherein:

the free-form surface mirror is constructed such that among the edges of the mirror in the vertical direction of the mirror, one edge on which the image light from the first optical system is incident at a large angle has a curvature smaller than a curvature of the other edge on which the image light from the first optical system is incident at a small angle.

* * * * *